United States Patent
Zhang et al.

(10) Patent No.: US 11,765,734 B2
(45) Date of Patent: Sep. 19, 2023

(54) TWO-STAGE UPLINK GRANT SCHEDULING WITH DISCONTINUOUS RECEPTION (DRX)

(71) Applicant: QUALCOMM INCORPORATED, San Diego, CA (US)

(72) Inventors: Xiaoxia Zhang, San Diego, CA (US); Jing Sun, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/304,734

(22) Filed: Jun. 24, 2021

(65) Prior Publication Data
US 2022/0046682 A1  Feb. 10, 2022

Related U.S. Application Data

(60) Provisional application No. 62/706,251, filed on Aug. 6, 2020.

(51) Int. Cl.
*H04W 72/23* (2023.01)
*H04W 72/1268* (2023.01)
(Continued)

(52) U.S. Cl.
CPC .......... *H04W 72/23* (2023.01); *H04L 1/1819* (2013.01); *H04W 24/08* (2013.01); *H04W 72/1268* (2013.01); *H04W 76/28* (2018.02)

(58) Field of Classification Search
None
See application file for complete search history.

(56) References Cited

U.S. PATENT DOCUMENTS

2019/0223035 A1*  7/2019  You ................... H04W 52/0212
2020/0314948 A1* 10/2020  Babaei ................ H04W 72/042
(Continued)

FOREIGN PATENT DOCUMENTS

EP        3360381 A1     8/2018
WO   WO-2022026663 A2 *  2/2022

OTHER PUBLICATIONS

Huawei, et al., "Impact on HARQ and DRX of Two-Stage Scheduling", 3GPP Draft, 3GPP TSG-RAN WG2 Meeting #95bis, R2-166460 Impact on HARQ and DRX of TWO-STAGE Scheduling, 3rd Generation Partnership Project (3GPP), Mobile Competence Centre, 650, Route Des Lucioles, F-06921 Sophia-Antipolis Cedex, F, vol. RAN WG2, No. Kaohsiung, Oct. 10, 2016-Oct. 14, 2016 Oct. 9, 2016 (Oct. 9, 2016), XP051150978, 5 Pages, Retrieved from the Internet: URL: http://www.3gpp.org/ftp/Meetings_3GPP_SYNC/RAN2/Docs/ [retrieved on Oct. 9, 2016] the whole document.
(Continued)

*Primary Examiner* — Saumit Shah
(74) *Attorney, Agent, or Firm* — Haynes and Boone, LLP

(57) ABSTRACT

Wireless communication systems and methods related to utilizing two-stage grants for uplink communications with discontinuous reception (DRX) operations are provided. In some aspects, a user equipment (UE) receive, from a base station (BS), a first downlink control information (DCI) message scheduling an uplink (UL) data transmission, the first DCI message indicating a first value for an UL schedule timing indicator. The UE activates a timer based at least in part on the first value of the UL schedule timing indicator. The UE monitors a downlink control channel based at least in part on the timer. The UE receives, from the BS, a second DCI message indicating UL schedule timing for the UL data transmission based at least in part on the monitoring.

27 Claims, 12 Drawing Sheets

(51) Int. Cl.
*H04W 76/28* (2018.01)
*H04L 1/1812* (2023.01)
*H04W 24/08* (2009.01)

(56) References Cited

U.S. PATENT DOCUMENTS

2021/0320760 A1* 10/2021 Rastegardoost ...... H04L 5/0055
2022/0007393 A1* 1/2022 Bai ....................... H04W 72/23

OTHER PUBLICATIONS

International Search Report and Written Opinion—PCT/US2021/039254—ISA/EPO—dated Nov. 17, 2021.

* cited by examiner

TWO-STAGE UPLINK GRANT SCHEDULING WITH DISCONTINUOUS RECEPTION (DRX)

CROSS REFERENCE TO RELATED APPLICATIONS

The present application claims priority to and the benefit of U.S. Provisional Patent Application No. 62/706,251, filed Aug. 6, 2020, which is hereby incorporated by reference in its entirety as if fully set forth below and for all applicable purposes.

TECHNICAL FIELD

The technology described below relates generally to wireless communication systems, and more particularly to utilizing two-stage grants for uplink communications with discontinuous reception (DRX) operations.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE), the method including receiving, from a base station (BS), a first downlink control information (DCI) message scheduling an uplink (UL) data transmission, the first DCI message indicating a first value for an UL schedule timing indicator; activating a timer based at least in part on the first value of the UL schedule timing indicator; monitoring a downlink control channel based at least in part on the timer; and receiving, from the BS, a second DCI message indicating UL schedule timing for the UL data transmission based at least in part on the monitoring.

In an additional aspect of the disclosure, a method of wireless communication performed by a base station (BS), the method including transmitting, to a user equipment (UE), a first downlink control information (DCI) message scheduling an uplink (UL) data transmission, the first DCI message indicating a first value for an UL schedule timing indicator; determining, based at least in part on the first value of the UL scheduling timing indicator, an active time for the UE to monitor a downlink control channel; and transmitting, to the UE based on the active time for the UE to monitor the downlink control channel, a second DCI message indicating UL schedule timing for the UL data transmission.

In an additional aspect of the disclosure, a user equipment (UE) includes a transceiver configured to receive, from a base station (BS), a first downlink control information (DCI) message scheduling an uplink (UL) data transmission, the first DCI message indicating a first value for an UL schedule timing indicator; and a processor configured to activate a timer based at least in part on the first value of the UL schedule timing indicator; and monitor a downlink control channel based at least in part on the timer, where the transceiver is further configured to receive, from the BS, a second DCI message indicating UL schedule timing for the UL data transmission based at least in part on the monitoring.

In an additional aspect of the disclosure, a base station (BS) includes a transceiver configured to transmit, to a user equipment (UE), a first downlink control information (DCI) message scheduling an uplink (UL) data transmission, the first DCI message indicating a first value for an UL schedule timing indicator; and a processor configured to determine, based at least in part on the first value of the UL scheduling timing indicator, an active time for the UE to monitor a downlink control channel, where the transceiver is further configured to transmit, to the UE based on the active time for the UE to monitor the downlink control channel, a second DCI message indicating UL schedule timing for the UL data transmission.

In an additional aspect of the disclosure, a non-transitory computer-readable medium having program code recorded thereon for wireless communication by a user equipment (UE), the program code including code for causing the UE to receive, from a base station (BS), a first downlink control information (DCI) message scheduling an uplink (UL) data transmission, the first DCI message indicating a first value for an UL schedule timing indicator; code for causing the UE to activate a timer based at least in part on the first value of the UL schedule timing indicator; code for causing the UE to monitor a downlink control channel based at least in part on the timer; and code for causing the UE to receive, from the BS, a second DCI message indicating UL schedule timing for the UL data transmission based at least in part on the monitoring.

In an additional aspect of the disclosure, a non-transitory computer-readable medium having program code recorded thereon for wireless communication by a base station (BS), the program code including code for causing the BS to transmit, to a user equipment (UE), a first downlink control information (DCI) message scheduling an uplink (UL) data transmission, the first DCI message indicating a first value for an UL schedule timing indicator; code for causing the BS to determine, based at least in part on the first value of the UL scheduling timing indicator, an active time for the UE to monitor a downlink control channel; and code for causing the BS to transmit, to the UE based on the active time for the UE to monitor the downlink control channel, a second DCI message indicating UL schedule timing for the UL data transmission.

In an additional aspect of the disclosure, a user equipment (UE) includes means for receiving, from a base station (BS), a first downlink control information (DCI) message scheduling an uplink (UL) data transmission, the first DCI message indicating a first value for an UL schedule timing indicator; means for activating a timer based at least in part on the first value of the UL schedule timing indicator; means for monitoring a downlink control channel based at least in part on the timer; and means for receiving, from the BS, a second DCI message indicating UL schedule timing for the UL data transmission based at least in part on the monitoring.

In an additional aspect of the disclosure, a base station (BS) includes means for transmitting, to a user equipment (UE), a first downlink control information (DCI) message scheduling an uplink (UL) data transmission, the first DCI message indicating a first value for an UL schedule timing indicator; means for determining, based at least in part on the first value of the UL scheduling timing indicator, an active time for the UE to monitor a downlink control channel; and means for transmitting, to the UE based on the active time for the UE to monitor the downlink control channel, a second DCI message indicating UL schedule timing for the UL data transmission.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
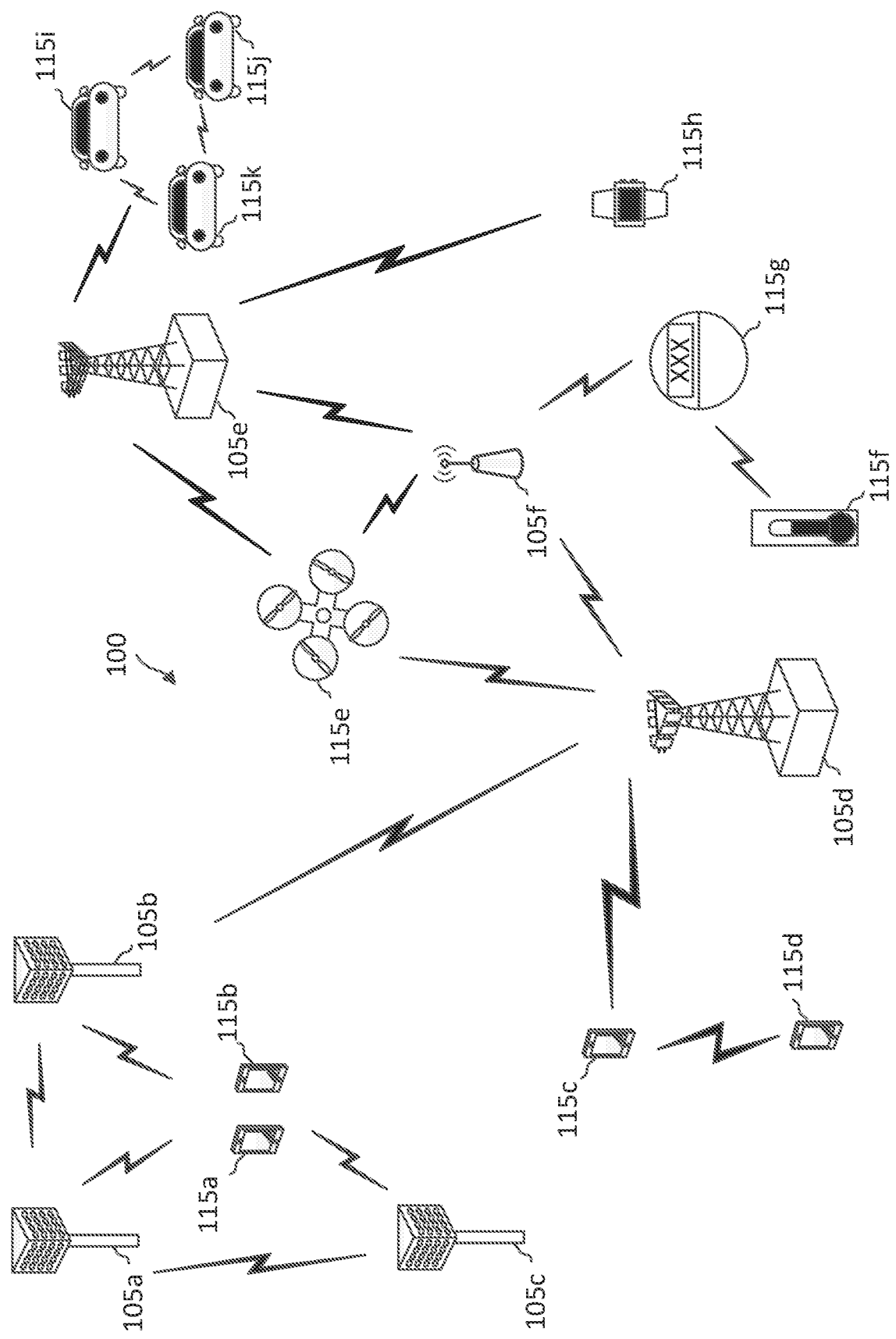
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over $^{80}/_{100}$ MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In some systems, a base station (BS) may configure a user equipment (UE) to operate in a discontinuous reception (DRX) mode, for example, for power saving at the UE. In the DRX mode, the UE may switch between an active state (for example, during which the UE monitors a DL control channel for DL control information (DCI) messages) and an inactive state. The UE may continue operating in the active state based on one or more timers. For example, a set of timers may maintain the active state for the UE while at least one timer of the set of timers is running Each timer may correspond to a specific activation trigger, a specific deactivation trigger, and a specific active duration. Examples of timers that maintain the active state at the UE may include an on-duration timer, an inactivity timer, and a retransmission timer. In some implementations, the UE may support other timers that may not maintain the active state, but may trigger activation of other timers or operations, such as a round-trip time (RTT) timer. If no timer maintaining the active state is currently running at the UE, the UE may operate in a sleep mode (for example, during which the UE may refrain from monitoring the DL control channel).

In some implementations, a BS may configure a UE with an UL scheduling grant for an UL transmission. The UL scheduling grant may be in the form of a downlink control information (DCI) message transmitted in a physical downlink control channel (PDCCH). The UL transmission may be a physical uplink shared channel (PUSCH) transmission and/or a physical uplink control channel (PUCCH) transmission. The UL scheduling grant may indicate a resource allocation and one or more transmission parameters (e.g., modulation coding scheme (MCS)) to be used for the UL transmission. Upon receiving the UL scheduling grant, the UE may prepare a data packet for transmission to the BS. For example, the UE may generate a transport block from the data packet based on the size of the resource allocation and the transmission parameters. The BS may schedule the UE in advance to allow time for the UE to prepare for the UL transmission (e.g., to generate the transport block). In some implementations, the BS may include an UL schedule timing indicator or offset, which may be referred to as a K2 value, in an UL scheduling grant. The K2 value may refer to an offset between a time (e.g., a DL slot) when the DCI message for the UL schedule is received and a time (e.g., an UL slot) when the UL data is to be transmitted. The offset may be dependent on the UE's processing capability. A smaller offset (shorter time) may be applied for a UE with a higher processing capability than for a UE with a reduced processing capability. In some instances, a UE with a high processing capability may prepare a data packet for transmission in about one ms, whereas a UE with a reduced processing capability may require a more relaxed processing timeline (e.g., about four ms) to prepare a data packet for transmission. Thus, the BS may configure a larger K2 value when scheduling UEs with reduced processing capabilities. In some instances, the K2 value may be in units of slots and the duration of a slot may be dependent on a numerology (e.g., subcarrier spacing and/or cyclic prefix duration) in use. As an example, when a slot duration is about 1 ms, the BS may schedule the UE with 4 ms in advance of the actual UL transmission by indicating a K2 value of 4 in an UL scheduling grant or DCI message.

In some implementations, the BS may communicate with the UE over a shared radio frequency band (e.g., in a shared spectrum or an unlicensed spectrum). One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may perform LBT to determine whether there are active transmissions in the channel. If the LBT results in an LBT pass, the transmitting node may transmit a preamble to reserve a channel occupancy time (COT) in the shared channel and may communicate with a receiving node during the COT. For example, the BS may contend for a COT by performing category 4 (CAT) LBT in the shared radio frequency band. After winning a COT, the BS may schedule the UE for communications in the COT. For instance, the BS may transmit an UL scheduling grant and/or a DL scheduling during the COT to schedule the UE for an UL communication and/or a DL communication.

In some instances, the shared radio frequency band may be regulated by a certain regulatory body and the duration of a COT may be regulated. For example, a regulation may limit the maximum duration of a COT to be about 6 ms. When the BS utilizes in-advance UL scheduling, where the BS transmits an UL scheduling grant 4 ms in advance of the scheduled time, the UL schedule may or may not fall within the BS's COT where the UL scheduled is transmitted. When the UL schedule is within the BS's COT, the UE may perform a category 2 (CAT2) LBT prior to the UL schedule and may transmit according to the UL schedule if the CAT2 LBT is successful. However, if the UL schedule is outside of the BS's COT, the UE may perform a CAT4 LBT prior to the UL schedule and may transmit according to the UL schedule if the CAT4 LBT is successful. A CAT4 LBT includes a random backoff, whereas a CAT2 LBT is a one-shot LBT without a random backoff. As such, a CAT2 LBT may have a higher success rate (or less uncertainty) in gaining access to the shared radio frequency band than a CAT4 LBT. Thus, it may be desirable for the BS to schedule the UE to transmit within the COT of the BS. However, if the BS transmits a UL scheduling grant towards an end of the COT, the UL schedule may be outside of the BS's acquired COT due to the in-advance UL scheduling (e.g., to provide a 4 ms processing timeline for the UE). In some other situations, the BS may not have any other DL transmission after transmitting the UL scheduling grant, and thus may leave the medium unoccupied for a time gap (between the transmission of the UL scheduling grant and the actual UL scheduled time). During the time gap, another wireless node may gain access to the medium and cause the UE to fail in gaining access to the medium at the time when the UL schedule begins.

One approach to ensuring that a UL schedule is within a COT of the BS is to utilize a two-stage UL grant. For example, the BS may transmit a first-stage UL grant with a non-numeric UL schedule timing offset (e.g., a non-numeric K2 value) in a first COT of the BS to trigger the UE in preparing a data packet for an UL transmission. The BS may subsequently acquire a second COT at a later time and transmit a second-stage UL grant including a numeric UL schedule timing offset (e.g., a numeric K2 value) in the second COT, for example, at the beginning of the second COT. In an example, the first-stage UL grant may indicate a K2 value of −1 and the second-stage UL grant may indicate a K2 value of 4 (e.g., 4 slots or 4 ms). Since the second-stage UL grant is transmitted at the beginning of the second COT, the UL schedule (with the 4 slots or 4 ms offset) can be within the second COT of the BS.

Upon receiving the first-stage UL grant, the UE may be aware that the first-stage UL grant is a trigger for an UL transmission preparation based on the K2 value being a non-numeric value, and thus may prepare an UL data packet for an UL transmission according to a resource allocation size and a MCS indicated by the first-stage UL grant. Upon receiving the second-stage UL grant, the UE may be aware that the second-stage UL grant indicates an actual UL scheduled transmission time based on the K2 value being a numeric value, and thus may transmit the already prepared UL transmission according to the K2 value (e.g., at an offset of 4 ms from the DL slot where the second-stage UL grant is received).

While utilizing two-stage UL grant scheduling may provide a more relaxed timeline for the UE to prepare for an UL transmission and enable the BS to schedule the UE to transmit within a COT of the BS, a two-stage UL grant can be problematic when the UE operates in a DRX mode. For example, when the UE operates in the DRX mode, the UE may activate an inactivity timer upon receiving a PDCCH DCI granting the first-stage UL grant. The UE may maintain in an active state and continue to monitor the PDCCH while the inactivity timer is in progress. However, when the inactivity timer expires, the UE may enter an inactive state and stop monitoring the PDCCH. Thus, if the BS transmits the second-stage UL grant after the inactivity timer expires, the UE may miss the second-stage UL grant and may not transmit the UL transmission as scheduled by the two-stage grant.

The present application provides mechanisms for utilizing two-stage UL grants for UL communications with DRX operations. For example, a BS may configure a UE to operate in a DRX mode. The BS may transmit a first DCI message to the UE, for example, during an on-duration of the DRX mode. The first DCI message may schedule the UE for an UL data transmission (e.g., a PUSCH transmission). To provide a certain processing timeline for the UE to prepare a data packet for the UL data transmission, the BS may include a first value for an UL schedule timing indicator in the first DCI message. The first value in the UL schedule timing indicator may indicate that the first DCI message is a first-stage UL grant of a two-stage UL scheduling grant. The first value in the UL schedule timing indicator may function as a trigger for the UE to prepare and/or generate a packet for the UL data transmission, but may not provide an actual or definite transmission time for transmitting the UL data transmission. In some aspects, the first value in the UL schedule timing indicator may explicitly indicate that the first DCI message is a trigger for UL data preparation and/or generation. In some aspects, the first value in the UL schedule timing indicator may correspond to a K2 parameter (with a non-numeric value for an UL scheduling offset). In some aspects, the first value in the UL schedule timing indicator may indicate partial timing information related to the actual transmission time.

When the UE receives the first DCI message, the UE may activate a timer (e.g., a RTT timer or a retransmission timer) based on the value for the UL schedule timing indicator. The activation of the timer may extend an active time of the UE in the DRX mode so that the UE may continue to monitor a DL control channel (e.g., PDCCH) to wait for a second-stage UL grant of the two-stage UL scheduling grant. After activating the timer, the UE may prepare a data packet for the UL transmission and store the prepared packet at the UE's memory. The BS may determine a time for the UE to monitor the DL control channel after receiving the first DCI message. For instance, the BS may configure the UE with a RTT timer duration and/or a retransmission timer duration, and thus may determine the time based on the duration configured for the RTT timer and/or the retransmission timer. The BS may transmit a second DCI message to the UE, for example, based on the time when the UE monitors the DL control channel. The second DCI message may be a second-stage UL grant corresponding to the first-stage UL grant indicated by the first DCI message. The second DCI message may indicate UL schedule timing for the UL data transmission either alone or in combination with the first DCI message. For instance, the second DCI message may include a second value for the UL schedule timing. The UE may transmit the UL data transmission based at least in part on the second value of a combination of the first value for the UL schedule timing indicator and the second value. In some aspects, the second DCI message may include a numeric value (e.g., a numeric K2 value indicating an offset from the second DCI message) for the UL schedule timing. In some other aspects, the UL schedule timing in the second DCI message may include timing information to be combined with the UL schedule timing indicator in the first DCI message to obtain complete timing information for the actual transmission time for the UL data transmission. For instance, the first value may indicate an offset (e.g., a number of slots) with respect to reference time indicated by the second value.

In some aspects, the timer may be a RTT timer specific to an UL hybrid automatic repeat request (HARQ) process of the UL transmission. Upon an expiry of the RTT UL timer, the UE may activate a retransmission timer specific to the UL HARQ process of the UL transmission. The UE may monitor the DL control channel while the retransmission timer is active or in progress. The UE may receive the second DCI message from the monitoring. Upon receiving the second DCI message, the UE may transmit the already prepared UL transmission according to the UL schedule timing or in combination with the first value in the first DCI message. In some aspects, the BS may transmit the first DCI message with repetition(s) to improve coverage. Accordingly, the UE may activate the RTT timer after receiving a last repetition of the first DCI message.

In some aspects, the timer may be a retransmission timer specific to an UL HARQ process of the UL transmission. The UE may utilize the retransmission timer without a RTT timer to extend an activation time of the UE in the DRX mode. The UE may monitor the DL control channel while the retransmission timer is active or in progress. The UE may receive the second DCI message from the monitoring. Upon receiving the second DCI message, the UE may transmit the already prepared UL transmission according to the UL schedule timing or in combination with the first value in the first DCI message. In some aspects, the BS may transmit the first DCI message with repetition(s) to improve coverage. Accordingly, the UE may start the retransmission timer after receiving a last repetition of the first DCI message.

Aspects of the present disclosure can provide several benefits. For example, activating a timer (e.g., the RTT timer and/or the retransmission timer) after receiving a first-stage scheduling grant (e.g., the first DCI message) at the UE can extend an active time of the UE during a DRX mode. The extended active time enables the UE to continue to monitor the DL control channel for a corresponding second-stage UL scheduling grant (e.g., the second DCI message). Thus, the present disclosure allows for two-stage UL scheduling technique to be employed with DRX operations. As such, a BS may provide a reduced-capability UE with a more relaxed timeline for preparing a data packet for UL transmission and continue to provide the UE with power saving opportunities using DRX.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots as will be discussed more fully below in relation to FIG. 2. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 may initiate an initial network attachment procedure with the network 100. When the UE 115 has no active data communication with the BS 105 after the network attachment, the UE 115 may return to an idle state (e.g., RRC idle mode). Alternatively, the UE 115 and the BS 105 can enter an operational state or active state, where operational data may be exchanged (e.g., RRC connected mode). For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the BS 105 may configure the UE 115 to operate in a DRX mode, for example, to conserve power at the UE 115. In the DRX mode, the UE 115 may switch between an active state (for example, during which the UE monitors a DL control channel or PDCCH for DCI messages) and an inactive state. The UE 115 may continue operating in the active state based on one or more timers. For example, a set of timers may maintain the active state for the UE 115 while at least one timer of the set of timers is running Each timer may correspond to a specific activation trigger, a specific deactivation trigger, and a specific active duration. Examples of timers that maintain the active state at the UE may include an on-duration timer, an inactivity timer, and a retransmission timer. In some implementations, the UE 115 may support other timers that may not maintain the active state, but may trigger activation of other timers or operations, such as an RTT timer. If no timer maintaining the active state is currently running at the UE 115, the UE 115 may operate in a sleep mode (for example, during which the UE 115 may refrain from monitoring the DL control channel).

Figure 2:
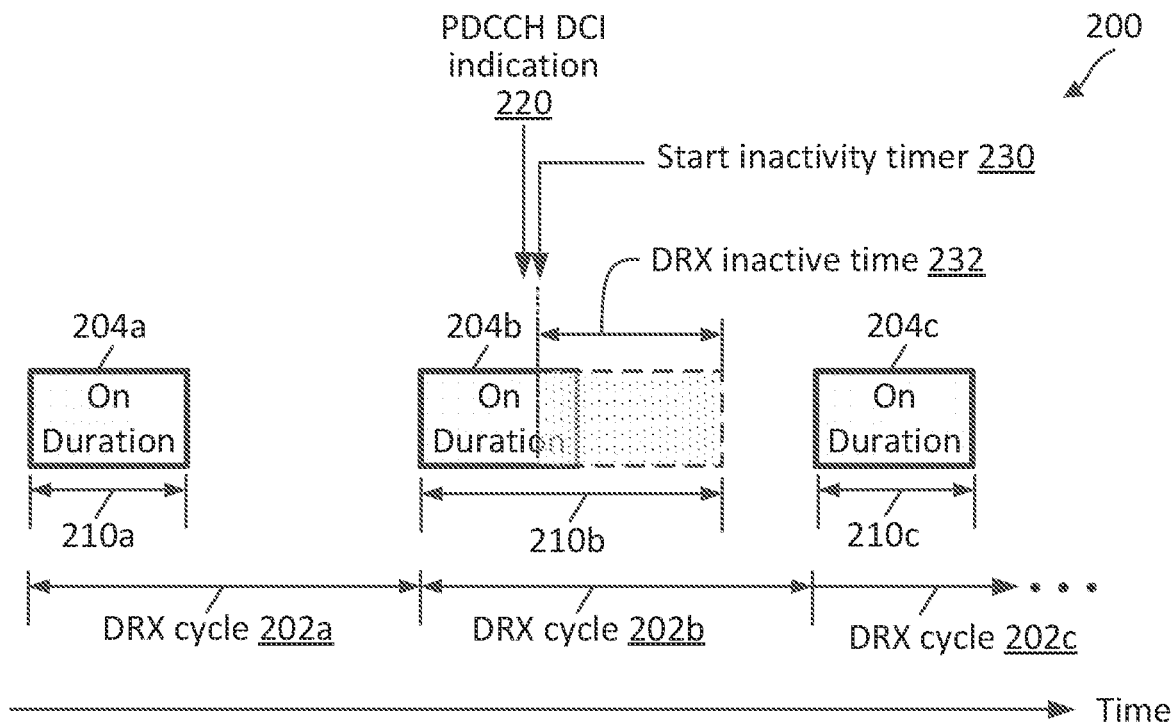
FIG. 2 illustrates a communication scheme that implements discontinuous reception (DRX) according to some aspects of the present disclosure.

FIG. 2 illustrates a communication scheme 200 with DRX operations according to some aspects of the present disclosure. The scheme 200 may be employed by BSs such as the BSs 105 and UEs such as the UEs 115 in a network such as the network 100 for communications. In particular, the BS may communicate with the UE in a DRX mode as shown in the scheme 200. In FIG. 2, the x-axis represents time in some arbitrary units.

In the scheme 200, a BS 105 and the UE 115 may employ DRX techniques, in which the UE 115 may operate in a DRX mode. In the DRX mode, the UE 115 has periods of time where reception of messages, transmission of messages, or both may not be available for the UE 115. For example, the DRX mode may allow the UE 115 to operate in two modes, an active mode and an inactive mode. In the active mode, the UE 115 may transmit data to the BS 105 and/or receive data from the BS 105. In the active mode, the UE 115 may additionally, or alternatively monitor for DL messages from the BS 105. In the inactive mode, however, the UE 115 may not transmit data to the BS 105 and/or receive data from the BS 105. In the inactive mode, the UE 115 may operate in a low power state, such as a sleep state, where data transmission and reception are disabled to allow the UE 115 to conserve power. In some implementations, the low power state may support a reduced set of operations at the UE 115 a (for example, receiving signals or beacons using a low power receiver).

The differing modes, whether active or inactive, may occur periodically. For example, the UE 115 may operate in the active mode for a time period. The UE 115 may operate in the inactive mode for another time period. The UE 115 may cycle between the active mode and the inactive mode according to a DRX schedule or periodicity. In some implementations, the total amount of time that it takes for the UE 115 to cycle between a first active mode to a second active mode (such as from the start of a first active mode, through a first inactive mode, and to the start of a second active mode) may be known as a DRX cycle. The UE 115 may continuously perform DRX cycles while in DRX mode. Operational capabilities of the medium access control (MAC) layer protocol data unit (PDU) for the UE 115 a may allow the UE 115 to operate in DRX mode. The UE 115 operating in DRX mode may allow the UE 115 to conserve power. For example, during inactive mode, the UE 115 may utilize less processing overhead, and therefore use less power than during an active mode. However, during the active mode, the UE 115 may use more power than during the inactive mode to accommodate a higher processing overhead. The UE 115 utilizing DRX mode may cycle between active and inactive modes or states (for example, between an "awake" state and a "sleep" state), and therefore the UE 115 may consume less power than a UE 115 operating continuously in an active mode.

In the illustrated example of FIG. 2, the BS 105 may configure the UE 115 to operate according to a DRX cycle 202 (shown as 202*a*, 202*b*, and 202*c*), which may occur periodically. The DRX cycle 202 includes a DRX on-duration 204 (shown as 204*a*, 204*b*, and 204*c*), which is deterministic and of a fixed time period. The DRX cycle 202 may also be fixed. The BS 105 may configure a deterministic set of starting times for DRX cycles 202 in the time domain. As an example, the DRX cycle 202 may be 100 ms, and the DRX on-duration may be 10 ms. In this example, the DRX cycle 202*a* may start at 0 ms, the DRX cycle 202*b* may start 100 ms, the DRX cycle 202*c* may start at 200 ms, and so on.

When operating in the DRX mode, the UE 115 may wake-up from a sleep state or inactive state and transition into an active state or active mode at the start of an on-duration 204. The UE 115 may monitor for PDCCH DCI during the on-duration 204. If the UE 115 detected a PDCCH DCI indicating a schedule for a DL or a UL transmission, the UE 115 may activate an inactivity timer after the detected PDCCH DCI. For instance, the UE 115 may activate the inactivity timer in a first symbol (e.g., OFDM symbol) after the detected PDCCH DCI. The UE 115 may remain in an active state or active time while the inactivity timer is active or in progress. As shown, in the DRX cycle 202*a*, the UE 115 is in an active time 210*a* over the on-duration 204*a*. In a next DRX cycle 202*b*, the UE 115 detected a PDCCH DCI indication 220 within the on-duration 204*b*. Upon detecting the PDCCH DCI indication 220, the UE 115 activates an inactivity timer 230. The UE 115 may configure the inactivity timer 230 with a DRX inactive time duration 232. The UE 115 may remain in the active time until the expiry of the inactivity timer 230. As shown, the UE 115 remains in an active time 210*b* in the DRX cycle 202b, where the active time 210b is extended beyond the on-duration 204b.

As long as the DRX inactivity timer 230 is running, the UE 115 may be considered to be in the DRX active time. When the UE 115 receives a new DL transmission or transmits a new UL transmission, the UE 115 may restart the DRX inactivity timer 230. If the data continues to flow (e.g., the UE 115 continues to receive new DL or transmit new UL transmissions), the UE 115 may remain in the DRX active time because the DRX inactivity timer 230 continues to run due to the UE 115 restarting the DRX activity timer 230. When the UE has no more DL data to receive or UL data to transmit, the UE 115 will not reset the DRX inactivity timer 230, which will eventually expire. When the DRX inactivity timer 230 expires, the UE 115 terminates or exits the DRX active time and enters DRX inactive time. As such, the time duration of the DRX inactive time is not fixed and is dependent on when the UE 115 terminates the DRX active time. The UE 115 may continue this on-and-off pattern or active-inactive pattern while in the DRX mode.

Figure 3:
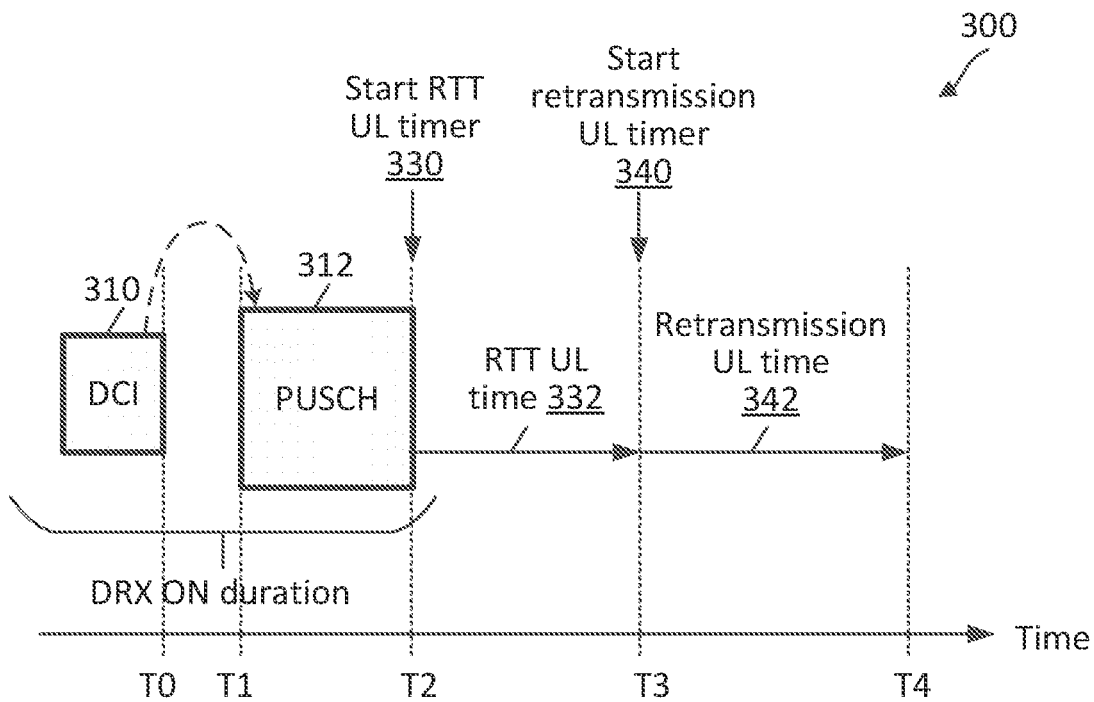
FIG. 3 illustrates an uplink (UL) communication scheme that implements DRX according to some aspects of the present disclosure.

FIG. 3 illustrates an UL communication scheme 300 that implements DRX according to some aspects of the present disclosure. The scheme 300 may be employed by BSs such as the BSs 105 and UEs such as the UEs 115 in a network such as the network 100 for communications. In particular, the BS may communicate UL communications with the UE in a DRX mode as shown in the scheme 300. In FIG. 3, the x-axis represents time in some arbitrary units. The scheme 300 may be employed in conjunction with the scheme 200. For instance, a BS 105 may transmit a DCI message 310 to a UE 115 during a DRX on-duration (e.g., the DRX on-durations 204) while the UE 115 operates in a DRX mode. The DCI message 310 may indicate an UL schedule for the UE 115 to transmit a PUSCH transmission 312. The BS 105 may transmit the DCI message 310 (e.g., at time T0) in advance of the UL schedule (e.g., time T1). The DCI message 310 may include a UL scheduling indicator indicating a K2 value (e.g., 4 for an offset of 4 slot-durations) corresponding to the time between time T0 and the time T1. The DCI message 310 may also indicate an allocated resource (e.g., a time-frequency resource), a MCS, and/or any information related to the transmission of the PUSCH transmission 312.

The UE 115 may monitor for PDCCH DCI from the BS 105 during the DRX on-duration. Upon receiving the DCI message 310, the UE 115 may prepare a data packet for UL transmission and transmit the data packet in the PUSCH transmission 312 according to the DCI message 310. For example, the UE 115 may generate a TB from a data packet according to a size of the resource allocation and the MCS indicated by the DCI message 310. The UE may determine a TB size (or number of information bits) that can be carried in the allocated resource with the indicated MCS and prepare the TB with the determined TB size.

In some aspects, the UE 115 may utilize HARQ techniques for the PUSCH transmission 312. The UE 115 may support one or more HARQ processes. Each HARQ process may be identified by a HARQ identifier (ID). The HARQ processes may operate independent of each other. Upon receiving the PUSCH transmission 312, the BS 105 may determine whether the PUSCH transmission 312 is received and decoded correctly. If the BS 105 determines that the PUSCH transmission 312 is successfully received, the BS 105 may schedule the UE 115 to transmit new data in a next UL schedule. However, if the BS 105 fails to receive the PUSCH transmission 312 correctly, the BS 105 may schedule the UE 115 to retransmit the PUSCH transmission 312 (the same UL data) in a next UL schedule. The BS 105 may repeat the retransmission scheduling until the BS 105 receives the PUSCH transmission 312 correctly or a retransmission retry exceeding a limit or a timeout.

When the UE 115 operates in the DRX mode, it may be desirable for the UE 115 to maintain in an active state after transmitting the PUSCH transmission 312. Otherwise, the BS 105 may have to wait till a next DRX cycle to schedule the UE 115 with a retransmission. Thus, the UE 115 may utilize one or more timers to maintain in the active time or active state so that the UE 115 may monitor or wait for a retransmission schedule instead of entering an inactive state. For instance, at time T2, the UE 115 may activate or start a RTT UL timer 330 after transmitting the PUSCH transmission 312 (e.g., a first transmission or repetition). For instance, the UE 115 may activate the RTT UL timer 330 in a first symbol (e.g., OFDM symbol) after the PUSCH transmission 312. The UE 115 may configure the RTT UL timer 330 with a RTT UL time duration 332. At time T3, when the RTT UL timer 330 expires, the UE 115 may activate or start a retransmission UL timer 340. The UE 115 may configure the retransmission UL timer 340 with a retransmission UL time duration 342. The UE 115 may monitor for PDCCH DCI from the BS 105 while the retransmission UL timer 340 is active (during the retransmission UL time duration 342 between time T3 and time T4).

In some aspects, the UE 115 may maintain a RTT UL timer and a retransmission UL timer for each HARQ process. In some instances, the RTT UL timer 330 may be referred to as a drx-HARQ-RTT-TimerUL, and the retransmission UL timer 340 may be referred to as a drx-RetransmissionTimerUL. The drx-HARQ-RTT-timerUL duration may be a minimum duration before a UL assignment for a HARQ retransmission is expected by a MAC entity of the UE 115. In some instances, the BS 105 may configure the UE 115 with timer durations for the drx-HARQ-RTT-timerUL and/or the drx-RetransmissionTimerUL via an RRC configuration. In some instances, the UE 115 may also stop or deactivate the retransmission UL timer 340 at time T2 (the first symbol after PUSCH transmission 312). The UE 115 may also activate an inactivity timer (e.g., the inactivity timer 230) after receiving the DCI message 310 as discussed above in relation to FIG. 2. When a DRX cycle is configured for the UE 115, the UE 115 may remain in an active state if any one of the inactivity timer, the RTT UL timer 330, the retransmission UL timer 340 is active, or in the presence of some conditions, for example, related to random access or scheduling request (SR) procedures.

Figure 4:
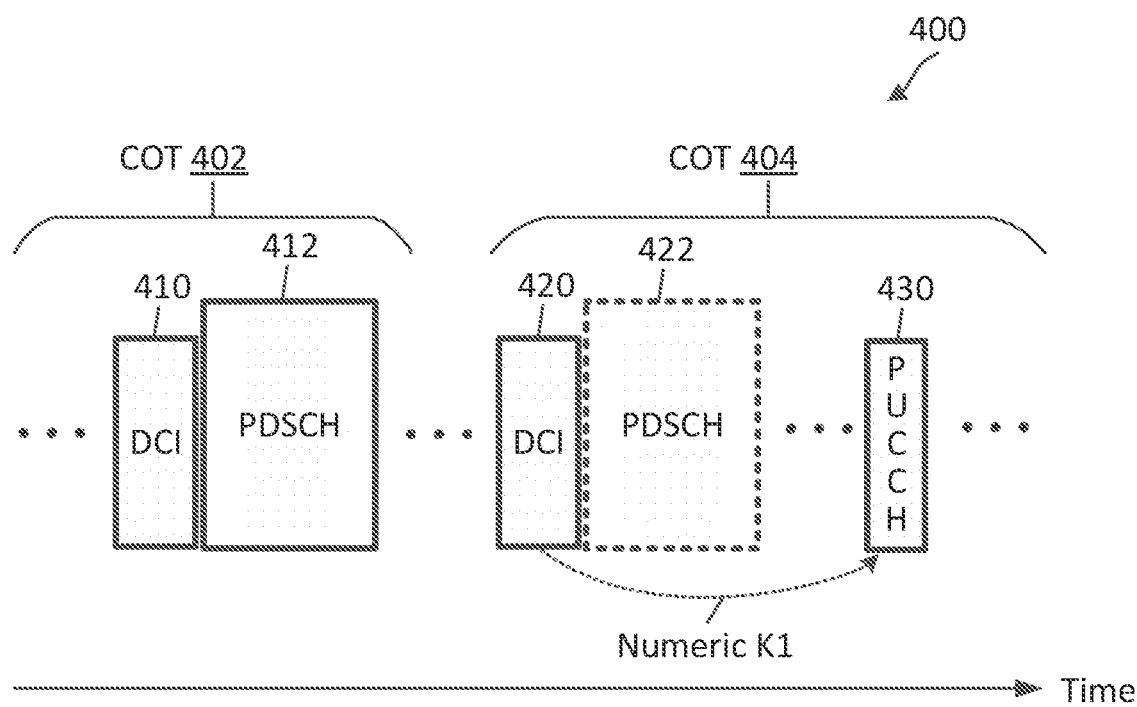
FIG. 4 illustrates a downlink (DL) communication scheme according to some aspects of the present disclosure.

FIG. 4 illustrates a DL communication scheme 400 according to some aspects of the present disclosure. The scheme 400 may be employed by BSs such as the BSs 105 and UEs such as the UEs 115 in a network such as the network 100 for communications. In particular, the BS may communicate DL communications with the UE as shown in the scheme 300. In FIG. 4, the x-axis represents time in some arbitrary units.

As discussed above, when a BS 105 communicates with a UE 115 in a shared radio frequency band, it may be desirable for the BS 105 to schedule the UE 115 to transmit within a COT of the BS 105 so that the UE 115 may have a greater chance in gaining access to the medium. When a BS 105 and a UE 115 utilize HARQ techniques for DL communications (e.g., PDSCH transmissions), the BS 105 may transmit a DL scheduling grant (e.g., DCI message) to the UE 115 and include an UL feedback timing indicator or offset, which may be referred to as a K1 value, in the DL scheduling grant. The K1 value may refer to an offset between a DL slot where the data is scheduled on PDSCH and an UL slot where the HARQ ACK/NACK feedback for the scheduled PDSCH data is to be sent. For instance, K1 may have a value of 1 indicating an offset of one slot.

To ensure that the UE 115 may transmit an HARQ ACK/NACK feedback for a PDSCH transmission within a COT of the BS 105, the BS 105 include a non-numeric K1 value (e.g., a value of −1 functioning as a wildcard) in a first DCI message for a PDSCH transmission and may include a numeric K1 value (indicating an actual feedback transmission time) in a later DCI message to trigger the UE 115 to transmit an HARQ ACK/NACK for the PDSCH transmission.

For instance, the BS 105 may acquire a COT 402 in a shared radio frequency band. The BS 105 may transmit a DCI message 410 in the COT 402 scheduling a DL transmission (e.g., a PDSCH transmission 412 with HARQ) with the UE 115. The DCI message 410 may include scheduling information and/or resource information associated with the PDSCH transmission 412 (e.g., DL data). For instance, the PDSCH transmission 412 is scheduled near the end of the COT 402. Thus, the BS 105 may include a non-numeric feedback schedule timing offset (e.g., a non-numeric K1 value) in the DCI message 410. The non-numeric feedback schedule timing offset may trigger the UE 115 to store an HARQ ACK/NACK for the PDSCH transmission 412. The BS 105 may transmit the PDSCH transmission 412 as scheduled. The BS 105 may subsequently acquire a COT 404. The BS 105 may transmit a DCI message 420 at the start of the COT 404 and may include a numeric K1 value in the DCI message 420 to trigger the UE 115 to transmit a HARQ ACK/NACK feedback for the PDSCH transmission 412. The HARQ ACK/NACK feedback may be transmitted in a PUCCH transmission 430.

Upon receiving the DCI message 410 in the COT 402, the UE may receive the PDSCH transmission 412 according to the scheduling information indicated by the DCI message 410. The UE 115 may be aware that the DCI message 410 indicates a non-numeric K1 value as the HARQ ACK/NACK reporting time for the PDSCH transmission 412. Thus, the UE 115 may hold on or store the HARQ ACK/NACK feedback until the BS 105 provides a normal K1 value (e.g., a numeric value) in a later DCI message or DL grant (e.g., in a next COT 404). Upon receiving the DCI message 420, the UE 115 may be aware that a normal K1 value is included in the DCI message 420, and thus may transmit an HARQ ACK/NACK for the PDSCH transmission 412 according to the K1 value (e.g., in the PUCCH transmission 430). If the UE 115 successfully received and decoded the PDSCH transmission 412, the UE 115 may transmit an ACK in the PUCCH transmission 430. Conversely, if the UE 115 fails to decode the PDSCH transmission 412, the UE 115 may transmit a NACK in the PUCCH transmission 430.

In some instances, the DCI message 420 may also schedule a PDSCH transmission 422 in the COT 404. The BS 105 may indicate that the numeric K1 value in the DCI message 420 may be used by the UE 115 to transmit HARQ ACK/NACK feedbacks (joint feedback) for both the PDSCH transmission 412 and the PDSCH transmission 422.

In the context of NR, DCI may include fallback DCI and non-fallback DCI. The fallback DCI format may be used as a default scheduling option to support basic NR operations, but may include some non-configurable fields. The non-fallback DCI format may be flexible (highly configurable) and may support a rich set of NR features. In some aspects, the fallback DCI format may not support the non-numeric K1 configuration.

Figure 5:
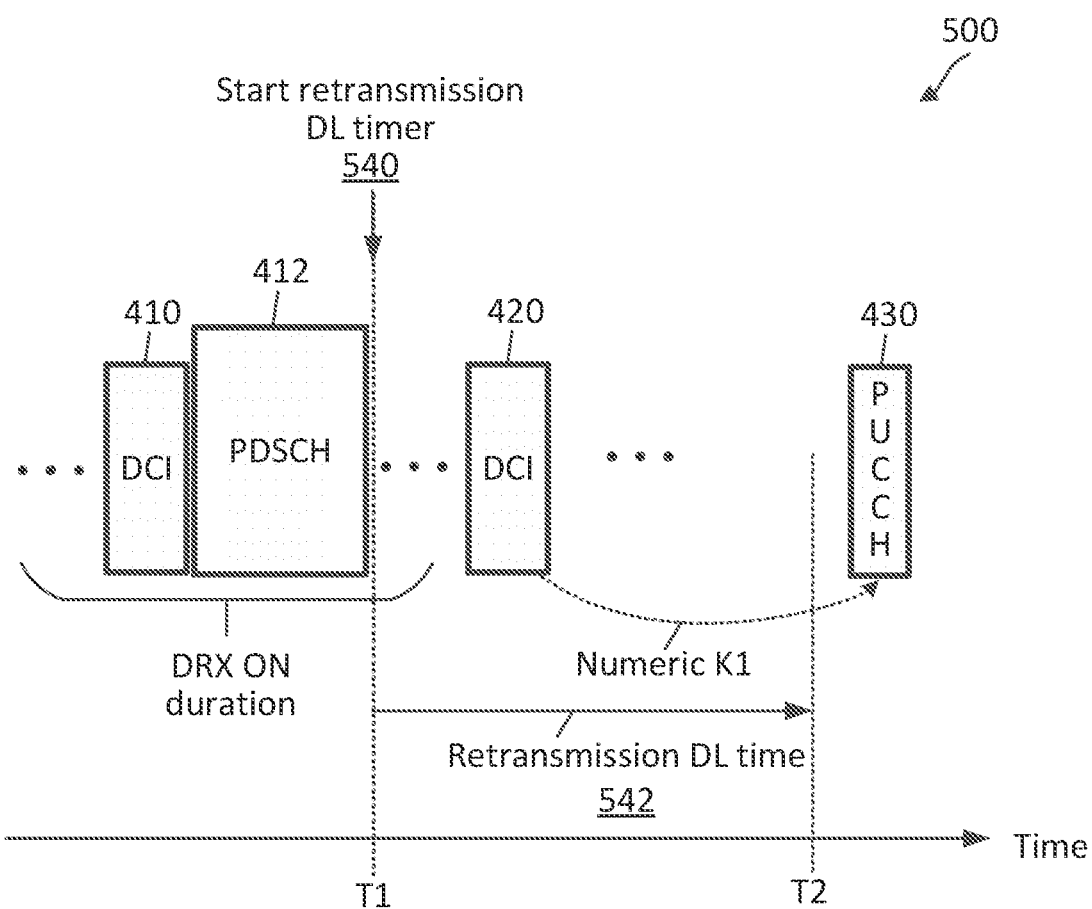
FIG. 5 illustrates a DL communication scheme that implements DRX according to some aspects of the present disclosure.

FIG. 5 illustrates a DL communication scheme 500 that implements DRX according to some aspects of the present disclosure. The scheme 500 may be employed by BSs such as the BSs 105 and UEs such as the UEs 115 in a network such as the network 100 for communications. In particular, the BS may communicate DL communications with the UE in a DRX mode as shown in the scheme 500. In FIG. 5, the x-axis represents time in some arbitrary units. The scheme 500 may be employed in conjunction with the scheme 200. The scheme 500 is described using the same DL and HARQ feedback scheduling timing as in the scheme 400, and may use the same reference numerals as in FIG. 4 for simplicity's sake.

In the scheme 500, the UE 115 may operate in a DRX mode, for example, similar to the DRX mode in the scheme 200 discussed above in relation to FIG. 2. For instance, the UE 115 may receive the DCI message 410 and the PDSCH transmission 412 during a DRX on-duration (e.g., the DRX on-durations 204). In the DRX mode, after the UE 115 receives the DCI message 410 with the non-numeric K1 value and the PDSCH transmission 412, the UE 115 may utilize one or more timers to extend an active state and continue monitoring the DL control channel for a DCI message with a numeric K1 value for the feedback timing. For instance, at time T1, the UE 115 may activate or start a retransmission DL timer 540 after receiving the PDSCH transmission 412 (e.g., a first transmission of a DL data packet). For instance, the UE 115 may activate the retransmission DL timer 540 in a first symbol (e.g., OFDM symbol) after the PDSCH transmission 412. The UE 115 may configure the retransmission DL timer 540 with a retransmission DL time duration 542. The UE 115 may monitor for PDCCH DCI from the BS 105 while the retransmission DL timer 540 is active (during the retransmission time DL 542 between time T1 and time T2). The UE 115 may receive the DCI message 420 from the monitoring and may transmit the HARQ ACK/NACK feedback for the PDSCH transmission 412 in the PUCCH transmission 430 according to the numeric K1 value indicated by the DCI message 420.

Similar to the UL HARQ discussed above in relation to FIG. 3, the BS 105 and the UE 115 may support multiple DL HARQ processes (e.g., about 8). The UE 115 may maintain a retransmission DL timer for each DL HARQ process. In some instances, the retransmission DL timer 540 may be referred to as a drx-RetransmissionTimerUL. In some instances, the BS 105 may configure the UE 115 with the drx-RetransmissionTimerUL via an RRC configuration. In some instances, the UE 115 may also activate an inactivity timer (e.g., the inactivity timer 230) as discussed above in relation to FIG. 2. When a DRX cycle is configured for the UE 115, the UE 115 may remain in an active state if any one of the inactivity timer, the RTT UL timer 330 of FIG. 3, the retransmission UL timer 340 of FIG. 3, or the retransmission DL timer 540 is active. As can be observed in the scheme 500, the UE 115 utilizes the retransmission DL timer 540 to extend an active time during a DRX cycle upon receiving a non-numeric K1 value in the DCI message 410.

As discussed above, in some situations, it may be desirable for a BS to schedule a UE for an UL communication using a two-stage UL grant, including a first-stage UL grant and a second-stage UL grant. In some implementations, the first-stage UL grant may include a non-numeric K2 value (e.g., a value of −1) and the second-stage UL grant may include a numeric K2 value. For instance, in some situations, the BS may transmit the first-stage UL grant (with the non-numeric K2 value) near the end of a first COT of the BS to trigger the UE to prepare a data packet for an UL transmission. The BS may subsequently acquire a second COT (via a CAT4 LBT) and transmit the second-stage UL grant (with the numeric K2 value) at a beginning portion of the second COT to provide the UE with an actual UL transmission time.

In some other implementations, the first-stage UL grant may include a numeric K2 value as well as an explicit two-stage UL grant indication. In such implementations, the second-stage UL grant may indicate when a subsequent COT starts as well as a reference slot where the K2 is relative to in the subsequent COT. For instance, in some situations, the BS may transmit the first-stage UL grant (with the explicit two-stage UL grant indication as well as a numeric K2 value relative to the reference time in the subsequent COT) near the end of a first COT of the BS to trigger the UE to prepare a data packet for an UL transmission. The BS may subsequently acquire a second COT (via a CAT4 LBT) and transmit a COT structure indication (COT-SI) at a beginning portion of the second COT. The COT-SI may indicate a reference slot for the K2 timeline for the UE to start an actual UL transmission. In essence, the two-stage UL grant refers to the case that the actual UL transmission time is a combination of two separate DCIs transmitted at different times. In some instances, both DCIs can be UE-specific UL grants. In some other instances, one DCI may be a UE-specific UL grant while the other DCI may provide additional timing information that is UE-specific (for one UE), group-specific (for a group of UEs), or cell-specific (for all UEs in a cell).

Figure 6:
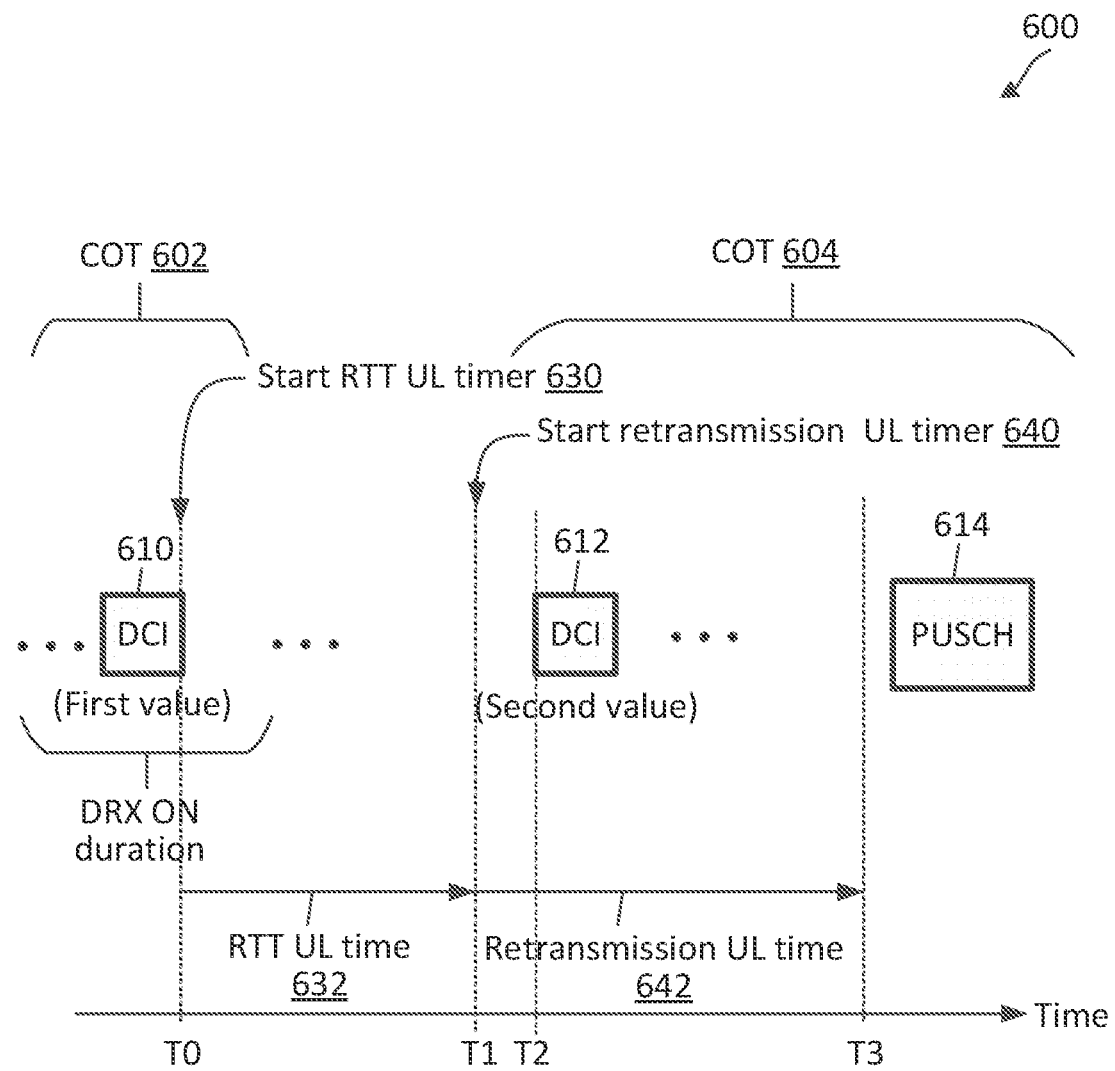
FIG. 6 illustrates an UL communication scheme that implements two-stage grant scheduling with DRX according to some aspects of the present disclosure.
Figure 7:
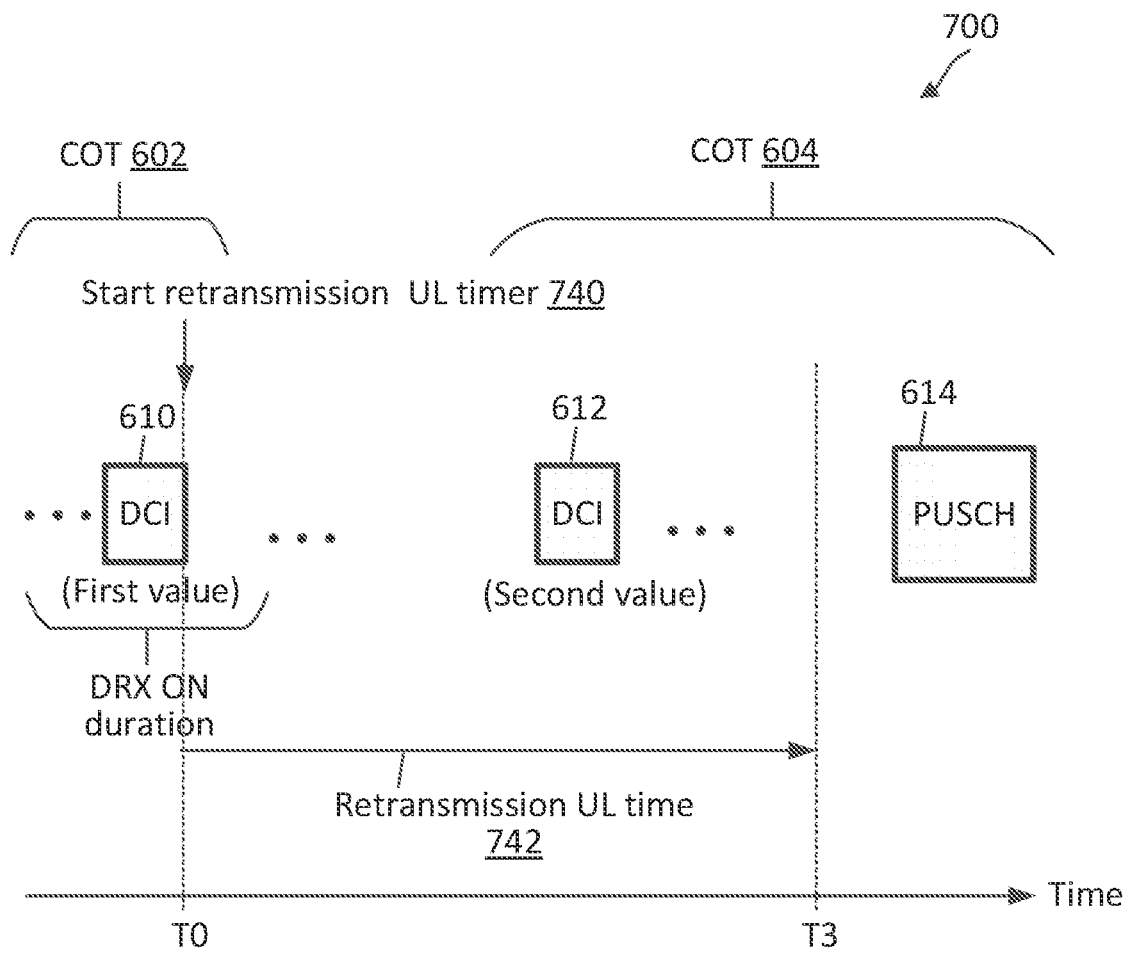
FIG. 7 illustrates an UL communication scheme that implements two-stage grant scheduling with DRX according to some aspects of the present disclosure.

According to aspects of the present disclosure, to enable two-stage UL grant scheduling with DRX, a UE may activate a timer after receiving a first-stage UL grant to extend an active time period in a DRX cycle so that the UE may monitor and receive a corresponding second-stage UL grant. FIGS. 6 and 7 illustrate various mechanisms for extending a UE active time for two-stage UL grant scheduling with DRX.

FIG. 6 illustrates an UL communication scheme 600 that implements two-stage grant scheduling with DRX according to some aspects of the present disclosure. The scheme 600 may be employed by BSs such as the BSs 105 and UEs such as the UEs 115 in a network such as the network 100 for communications. In particular, the BS may communicate UL communications with the UE in a DRX mode as shown in the scheme 600. In FIG. 6, the x-axis represents time in some arbitrary units. The scheme 600 may be employed in conjunction with the scheme 200.

In the scheme 600, a BS 105 may configure a UE 115 to operate in a DRX mode, for example, as discussed above in relation to FIG. 2. The BS 105 may transmit a DCI message 610 (via a PDCCH) to schedule a UE 115 for a UL transmission (e.g., a PUSCH transmission 614). The BS 105 may transmit the DCI message 610 during a DRX on-duration (e.g., the DRX on-duration 204) of the UE 115. The DCI message 610 may be a first-stage UL grant including an UL schedule timing indicator with a first value. In some aspects, the first value may explicitly indicate that the DCI message 610 is a trigger for UL data preparation and/or generation. In some aspects, the first value may correspond to a K2 parameter (with a non-numeric value for an UL scheduling offset). For instance, the non-numeric K2 value may be a value of −1 (e.g., an out-of-range value). The DCI message 610 may also indicate a resource (e.g., time-frequency resources spanning one or more symbol in time and one or more RBs in frequency) allocated for the PUSCH transmission 614 and/or a MCS. In some aspects, the PUSCH transmission 614 is associated with an UL HARQ process. For instance, the UE 115 may maintain multiple UL HARQ processes and each UL HARQ process may be identified by a unique HARQ ID. Accordingly, the DCI message 610 may also indicate one or more HARQ parameters, such as a HARQ ID, a redundancy version (RV), and/or a new data indicator (NDI), specific to the PUSCH transmission 614.

The UE 115 may monitor for a PDCCH DCI from the BS 105 during the DRX on-duration. Upon detecting the DCI message 610 scheduling a UL transmission with the first value, the UE 115 may start a DRX timer, such as a RTT UL timer 630, so that the UE 115 may maintain an active time (e.g., which may extend beyond the DRX on-duration) to wait for a corresponding second-stage UL grant. As shown, at time T0, the UE 115 activates the RTT UL timer 630 after receiving the DCI message 610. The RTT UL timer 630 may be associated with the HARQ process identified by the HARQ ID indicated by the DCI message 610. In some aspects, the UE 115 may activate the RTT UL timer 630 after receiving the first-stage UL grant (e.g., the DCI message 610). For instance, the UE 115 may activate the RTT UL timer 630 in a first symbol (e.g., OFDM symbol) after the first-stage UL grant. In other words, the UE 115 may activate the RTT UL timer 630 in a symbol immediately after the symbol where the UE 115 received the DCI message 610. For instance, if the DCI message 610 is received in symbol 4 of a slot (e.g., having symbols indexed from 0 to 13), the UE 115 may activate the RTT UL timer 630 at the beginning of symbol 5 of the slot. The UE 115 may configure the RTT UL timer 630 with a RTT UL time duration 632.

After activating the RTT UL timer 630, the UE 115 may prepare a data packet for UL transmission according to the DCI message 610. For instance, the UE 115 may generate a TB according to a number of resource elements (REs) in the allocated resource and the MCS indicated by the DCI message 610. For instance, the UE 115 may perform encoding and/or modulation on the UL data packet to generate the TB. However, the UE 115 may not transmit encoded/modulated TB. For example, the UE 115 may store the encoded/modulated TB a memory (e.g., the memory 1304) of the UE 115 until the UE 115 receives a corresponding second-stage UL grant from the BS 105.

At time T1, when the RTT UL timer 630 expires, the UE 115 may activate or start a retransmission UL timer 640. The retransmission UL timer 640 may be associated with the HARQ process identified by the HARQ ID indicated by the DCI message 610. The UE 115 may configure the retransmission UL timer 640 with a retransmission UL time duration 642. The UE 115 may monitor for PDCCH DCI from the BS 105 while the retransmission UL timer 640 is active (during the retransmission UL time duration 642 between time T1 and time T3).

As shown, at time T2, the BS 105 transmits a DCI message 612 to the UE 115. The DCI message 612 may include a second-stage UL grant corresponding to the first-stage UL grant in the DCI message 610. The DCI message 612 may include an UL schedule timing indicator including a second value. In some aspects, the second value may be a numeric K2 value indicating an offset from the DL slot where the DCI message 612 is transmitted to an UL slot where the PUSCH transmission 614 is to be transmitted. Accordingly, when the UE 115 receives the DCI message 612, the UE 115 may transmit the prepared and stored TB in the PUSCH transmission 614 as scheduled by the second value. For instance, if the first value indicates a value of 4, the UE 115 may transmit the PUSCH transmission 614 four slots after receiving the DCI message 612.

In some aspects, the scheme 600 may be performed over a shared radio frequency band. The BS 105 may contend for a first COT 602 based on passing a CAT4 LBT in the shared radio frequency band. The BS 105 may transmit the DCI message 610 within the first COT 602 and near an end of the first COT 602. After the first COT 602 ended, the BS 105 may subsequently contend for a second COT 604 based on passing a CAT4 LBT in the shared radio frequency band. The BS 105 may transmit the second DCI message 612 at a beginning portion of the second COT 604 of the BS 105. The second value may schedule the PUSCH transmission 614 within the second COT 604 of the BS 105. In some aspects, the UE 115 may perform an LBT prior to transmitting the PUSCH transmission 614. The UE 115 may be aware that the schedule for the PUSCH transmission 614 is within the second COT 604 of the BS 105. As such, the UE 115 may perform a CAT2 LBT prior to the schedule and transmit the PUSCH transmission 614 upon passing the CAT2 LBT.

In some other aspects, the first-stage UL grant in the DCI message 610 may include an explicit indication indicating that the DCI message 610 includes the first-stage UL grant for triggering a preparation and/or generate for the PUSCH transmission 614, but without complete timing information for the actual transmission. In some instances, the first-stage UL grant in the DCI message 610 may include a UL schedule offset (a numeric K2 value) with respect to a reference time (e.g., slot) to be provided by the second-stage UL grant in the DCI message 612.

In general, the second-stage UL grant may provide additional information for determining an actual UL transmission time, and may be UE-specific, group-specific, or cell-specific. Accordingly, the UE 115 may be aware that the DCI message 610 does not provide an actual transmission time, and may monitor for a subsequent DCI message 612 (a corresponding second-stage UL grant) and determine the actual transmission time based on a combination of information provided by the DCI message 610 and the DCI message 612.

In some aspects, the UE 115 may maintain a RTT UL timer and a retransmission UL timer for each HARQ process. In some instances, the RTT UL timer 630 may be referred to as a drx-HARQ-RTT-TimerUL, and the retransmission UL timer 640 may be referred to as a drx-RetransmissionTimerUL. In some instances, the BS 105 may configure the UE 115 with a timer duration for the drx-HARQ-RTT-timerUL and/or a timer duration for the drx-RetransmissionTimerUL via an RRC configuration. In some instances, the UE 115 may also stop or deactivate the retransmission UL timer 640 after receiving the DCI message 610 (e.g., at the symbol immediate after the DCI message 610) and/or after receiving the DCI message 612 (e.g., at the symbol immediate after the DCI message 612). The UE 115 may also activate an inactivity timer (e.g., the inactivity timer 230) as discussed above in relation to FIG. 2. For instance, the UE 115 may active the inactivity timer after receiving the DCI message 610 and/or 612. When a DRX cycle is configured for the UE 115, the UE 115 may remain in an active state if any one of the inactivity timer, the RTT UL timer 630, the retransmission UL timer 640 is active, or in the presence of some conditions, for example, related to random access or SR procedures.

As can be observed from the scheme 600, the activation of the timer 630 based on receiving the DCI message 610 with the first value and the subsequent activation of the timer 640 allows the UE to extend an active state in a DRX cycle (e.g., the DRX cycle 202) and continue monitoring a PDCCH for a DCI message (e.g., the DCI message 612) with the second value to obtain complete information for the UL transmission scheduled time.

FIG. 7 illustrates an UL communication scheme 700 that implements two-stage grant scheduling with DRX according to some aspects of the present disclosure. The scheme 700 may be employed by BSs such as the BSs 105 and UEs such as the UEs 115 in a network such as the network 100 for communications. In particular, the BS may communicate UL communications with the UE in a DRX mode as shown in the scheme 600. In FIG. 7, the x-axis represents time in some arbitrary units. The scheme 600 may be employed in conjunction with the scheme 200. The scheme 700 is described using the same UL scheduling timeline as in the scheme 600, and may use the same reference numerals as in FIG. 6 for simplicity's sake.

The scheme 700 is substantially similar to the scheme 600. However, in the scheme 700, at time T0, upon receiving the DCI message 610 (carrying a first-stage UL grant with the first value), the UE 115 activates a retransmission UL timer 740 instead of the RTT UL timer 630 as in the scheme 600. The retransmission UL timer 740 may be associated with the HARQ process identified by the HARQ ID indicated by the DCI message 610. The retransmission UL timer 740 may be substantially similar to the retransmission UL timer 640, for example, a drx-RetransmissionTimerUL. In some aspects, the UE 115 may activate the retransmission UL timer 740 after receiving the first-stage UL grant (e.g., the DCI message 610). For instance, the UE 115 may activate the retransmission UL timer 740 in a first symbol (e.g., OFDM symbol) after the first-stage UL grant. In other words, the UE 115 may activate the retransmission UL timer 740 in a symbol immediately after the symbol where the UE 115 received the DCI message 610. For instance, if the DCI message 610 is received in symbol 4 of a slot (e.g., having symbols indexed from 0 to 13), the UE 115 may activate the retransmission UL timer 740 at the beginning of symbol 5 of the slot. The UE 115 may configure the retransmission UL timer 740 with a retransmission UL time duration 742, which may be configure by the BS 105 via an RRC configuration.

Similar to the scheme 600, after activating the retransmission UL timer 740, the UE 115 may prepare a data packet for UL transmission according to the DCI message 610 as discussed above in relation to FIG. 6. The UE 115 may monitor for PDCCH DCI from the BS 105 while the retransmission UL timer 740 is active (during the retransmission UL time duration 642 between time T0 and time T3). The UE 115 may receive the DCI message 612 including the second-stage UL grant (indicating the second value) from the monitoring. The UE 115 may transmit the prepared and stored TB in the PUSCH transmission 614 as scheduled by the second value alone, for example, when the second value indicates a numeric K2 value offset from a slot where the DCI message 612 is received. Alternatively, The UE 115 may transmit the prepared and stored TB in the PUSCH transmission 614 as scheduled by the first value and the second value alone, for example, when the first value indicates a numeric K2 value offset with respect to a reference time provided by the second value.

In some aspects, it may be advantageous to utilize the scheme 600 where the UE 115 activates a RTT UL timer after receiving the DCI message 610, for example, to be more compatible with current HARQ operations with DRX. In some other instances, it may be advantageous to utilize the scheme 700 where the UE 115 activates a retransmission timer after receiving the DCI message 610, for example, for a simpler implementation.

In some aspects, a UE (e.g., the UEs 115) with a reduced processing capability may also include a reduced number of antennas (e.g., the antennas 1316), and thus there may be a loss in coverage or reach for a UE with a reduced capability. One way to improve or maintain coverage to enable reduced-capability UEs to access a network (e.g., the network 100) is for a BS (e.g., the BS 105) to transmit PDCCH DCI with multiple repetitions. A UE receiving multiple repetitions of a DCI message may combine the multiple repetitions (using signal combining) received from the BS and perform decoding in the combined signal to increase a DCI decoding performance FIGS. 8 and 9 illustrate various mechanisms for extending a UE active time for two-stage UL grant scheduling with DRX and an improved coverage.

Figure 8:
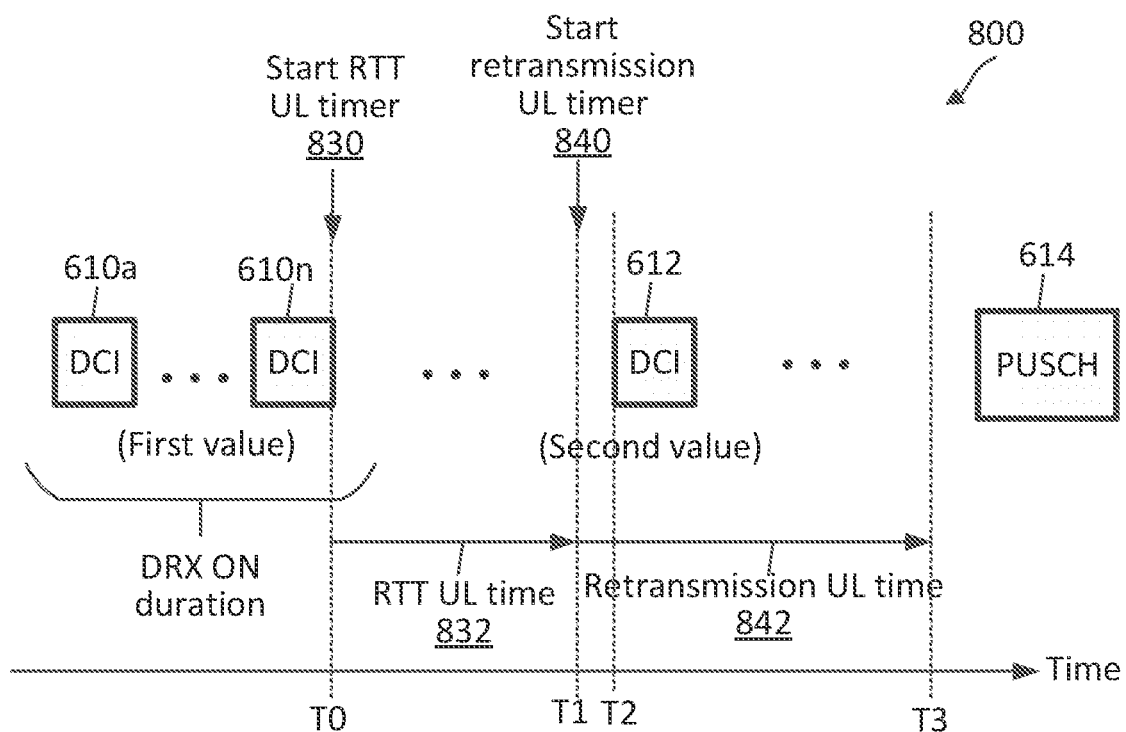
FIG. 8 illustrates an UL communication scheme that implements two-stage grant scheduling with DRX according to some aspects of the present disclosure.
Figure 9:
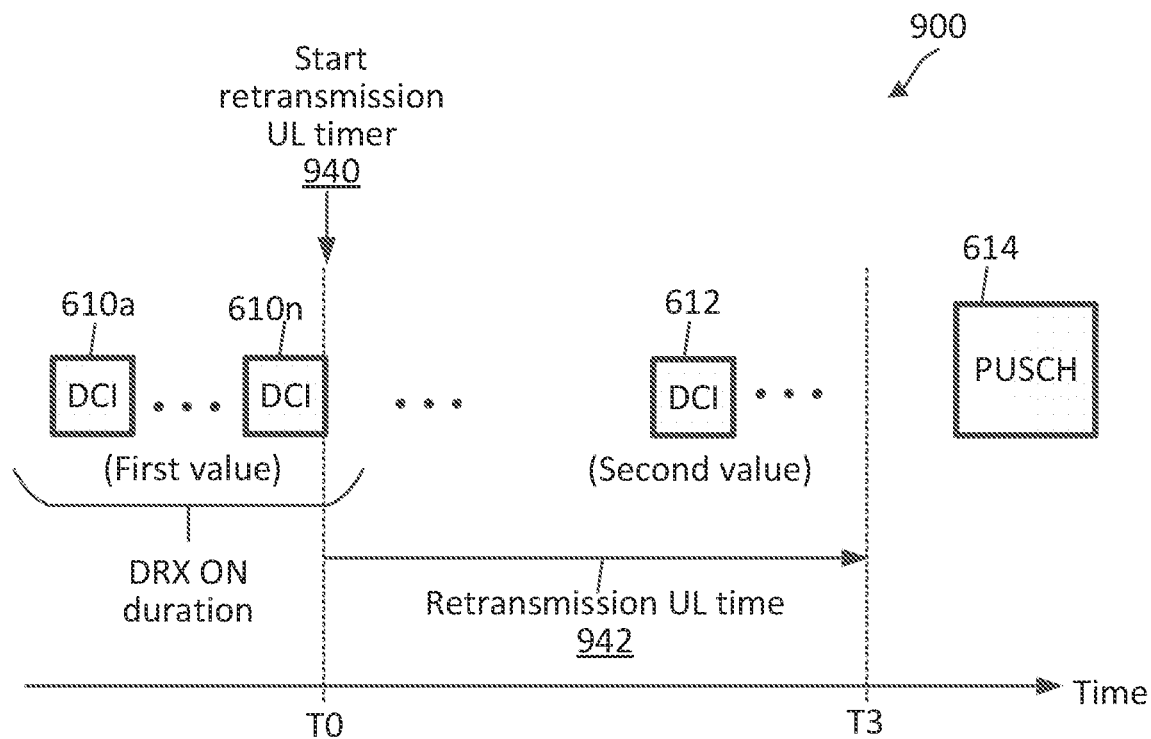
FIG. 9 illustrates an UL communication scheme that implements two-stage grant scheduling with DRX according to some aspects of the present disclosure.

FIG. 8 illustrates an UL communication scheme 800 that implements two-stage grant scheduling with DRX according to some aspects of the present disclosure. The scheme 800 may be employed by BSs such as the BSs 105 and UEs such as the UEs 115 in a network such as the network 100 for communications. In particular, the BS may communicate UL communications with the UE in a DRX mode as shown in the scheme 800. In FIG. 8, the x-axis represents time in some arbitrary units. The scheme 800 may be employed in conjunction with the scheme 200. The scheme 800 is described using the same UL scheduling timeline as in the scheme 600, and may use the same reference numerals as in FIG. 6 for simplicity's sake.

The scheme 800 is substantially similar to the scheme 600. However, in the scheme 800, a BS 105 may transmit multiple repetitions of a DCI message 610 (shown as 610a, ..., 610n) to schedule a UE 115 for a UL transmission (e.g., a PUSCH transmission 614). The PUSCH transmission 614 may be associated with a certain HARQ process identified by a HARQ ID. The BS 105 may transmit the DCI messages 610a, ..., 610n, during a DRX on-duration (e.g., the DRX on-duration 204) of the UE 115. The repeated transmissions of the DCI message 610 enable the UE 115 to perform signal combining for DCI decoding. The signal combining can improve the DCI decoding performance at the UE 115. In other words, the BS 105 may reach the UE 115 from a farther distance and/or when operating in a lower signal-to-noise ratio (SNR) condition.

In the illustrated example of FIG. 8, the BS 105 may transmit a DCI message 610a carrying a first-stage UL grant for the UE 115. The DCI message 610a may include a resource allocation, one or more transmission parameters (e.g., MCS, HARQ ID, RV, NDI), and an UL scheduling indicator indicating a first value. The BS 105 may repeat the transmission of the DCI message 610 (e.g., the DCI message 610n) a number of times (e.g., about 1, 2, 3, 4, 5, 6, 7, 8 or more). In other words, each DCI message 610a to 610n carries the same content (e.g., the first-stage UL grant). The number of repetitions may depend on a desired coverage. In some aspects, the BS 105 may configure the UE 115 with a configuration (e.g., an RRC configuration) indicating a number of repetitions to be used for transmitting PDCCH DCI. In some other instances, the number of PDCCH repetitions may be predetermined and known by the BS 105 and the UE 115.

The UE 115 may monitor for a PDCCH DCI from the BS 105 during the DRX on-duration. Upon detecting the DCI message 610a scheduling a UL transmission with the first value, the UE 115 may continue to monitor for the DCI message 610 until all repetitions are received, for example, based on the configuration received from the BS 105 or a predetermined configuration. After receiving a last repetition of the DCI message 610 (e.g., 610n), the UE 115 may utilize a RTT UL timer 830 and a retransmission UL timer 840 similar to the RTT UL timer 630 and the retransmission UL timer 640, respectively, to extend an active time of the UE 115 in the DRX cycle (e.g., the DRX cycle 202). For instance, the UE 115 may activate the RTT UL timer 830 in a first symbol (e.g., at time T0) after receiving a last repetition of the first-stage UL grant (e.g., the DCI message 610n). The UE 115 may configure the RTT UL timer 830 with a RTT UL time duration 832. The RTT UL timer 830 may be associated with the HARQ process identified by the HARQ ID indicated by the DCI message 610. After activating the RTT UL timer 830, the UE 115 may prepare a data packet for UL transmission according to the first-stage UL grant indicated by the DCI message 610 as discussed above in relation to FIG. 6.

At time T1, when the RTT UL timer 830 expires, the UE 115 may activate the retransmission UL timer 840. The retransmission UL timer 840 may be associated with the HARQ process identified by the HARQ ID indicated by the DCI message 610. The UE 115 may configure the retransmission UL timer 840 with a retransmission UL time duration 842. The UE 115 may monitor for PDCCH DCI from the BS 105 while the retransmission UL timer 840 is active (during the retransmission UL time duration 842 between time T1 and time T3).

At time T2, the BS 105 transmits a DCI message 612 to the UE 115. The DCI message 612 may include a second-stage UL grant corresponding to the first-stage UL grant in the DCI message 610. The DCI message 612 may include a second value. In some aspects, the first value is a non-numeric K2 value and the second value is a numeric K2 value indicating an offset from the DL slot where the DCI message 612 is transmitted to an UL slot where the PUSCH transmission 614 is to be transmitted. Accordingly, when the UE 115 receives the DCI message 612, the UE 115 may transmit the prepared and stored TB in the PUSCH transmission 614 as scheduled by the numeric K2 value. In some other aspects, the first value in the DCI message 610 may include a UL schedule offset (a numeric K2 value) with respect to a reference time (e.g., slot) to be provided by the second value in the DCI message 612.

Although FIG. 8 illustrates the DCI message 612 carrying the second-stage UL grant without any repetition, it should be understood that in other examples the BS 105 may also transmit the DCI message 612 with repetitions. Additionally, the BS 105 may transmit the DCI messages 610 with repetitions during a first COT (e.g., the COT 602) of the BS 105 and may transmit the DCI message 612 during a second COT (e.g., the COT 604) of the BS 105 as discussed above in relation to FIG. 6.

FIG. 9 illustrates an UL communication scheme 900 that implements two-stage grant scheduling with DRX according to some aspects of the present disclosure. The scheme 900 may be employed by BSs such as the BSs 105 and UEs such as the UEs 115 in a network such as the network 100 for communications. In particular, the BS may communicate UL communications with the UE in a DRX mode as shown in the scheme 900. In FIG. 9, the x-axis represents time in some arbitrary units. The scheme 900 may be employed in conjunction with the scheme 200. The scheme 900 is described using the same UL scheduling timeline as in the scheme 600, and may use the same reference numerals as in FIG. 6 for simplicity's sake.

The scheme 900 is substantially similar to the scheme 800. For example, a BS 105 may transmit multiple repetitions of a DCI message 610 (shown as 610a, . . . , 610n) to schedule a UE 115 for a UL transmission (e.g., a PUSCH transmission 614). The DCI message 610 may include a first-stage UL grant indicating a first value. The PUSCH transmission 614 may be associated with a certain HARQ process identified by a HARQ ID. The BS 105 may transmit the DCI messages 610a, . . . , 610n, during a DRX on-duration (e.g., the DRX on-duration 204) of the UE 115. However, in the scheme 900, the UE 115 activates a retransmission UL timer 940 instead of the RTT UL timer 830 after receiving a last repetition of the DCI message 610 (e.g., the DCI message 610n). In some aspects, the UE 115 may activate the retransmission UL timer 940 in a first symbol after receiving a last repetition of the DCI message 610 (e.g., the DCI message 610n). The retransmission UL timer 940 may be associated with the HARQ process identified by the HARQ ID indicated by the DCI message 610. The UE 115 may configure the retransmission UL timer 940 with a retransmission UL time duration 942, which may be configure by the BS 105 via an RRC configuration.

Similar to the scheme 800, after activating the retransmission UL timer 940, the UE 115 may prepare a data packet for UL transmission according to the DCI message 610 as discussed above in relation to FIG. 6. The UE 115 may monitor for PDCCH DCI from the BS 105 while the retransmission UL timer 940 is active (during the retransmission time UL 942 between time T0 and time T3). The UE 115 may receive the DCI message 612 including the second-stage UL grant indicating a second value from the monitoring. In some aspects, the first value is a non-numeric K2 value and the second value is a numeric K2 value indicating an offset from the DL slot where the DCI message 612 is transmitted to an UL slot where the PUSCH transmission 614 is to be transmitted. Accordingly, when the UE 115 receives the DCI message 612, the UE 115 may transmit the prepared and stored TB in the PUSCH transmission 614 as scheduled by the numeric K2 value. In some other aspects, the first value in the DCI message 610 may include a UL schedule offset (a numeric K2 value) with respect to a reference time (e.g., slot) to be provided by the second value in the DCI message 612.

Although FIG. 9 illustrates the DCI message 612 carrying the second-stage UL grant without any repetition, it should be understood that in other examples the BS 105 may also transmit the DCI message 612 with repetitions. Additionally, the BS 105 may transmit the DCI messages 610 with repetitions during a first COT (e.g., the COT 602) of the BS 105 and may transmit the DCI message 612 during a second COT (e.g., the COT 604) of the BS 105 as discussed above in relation to FIG. 6.

Figure 10:
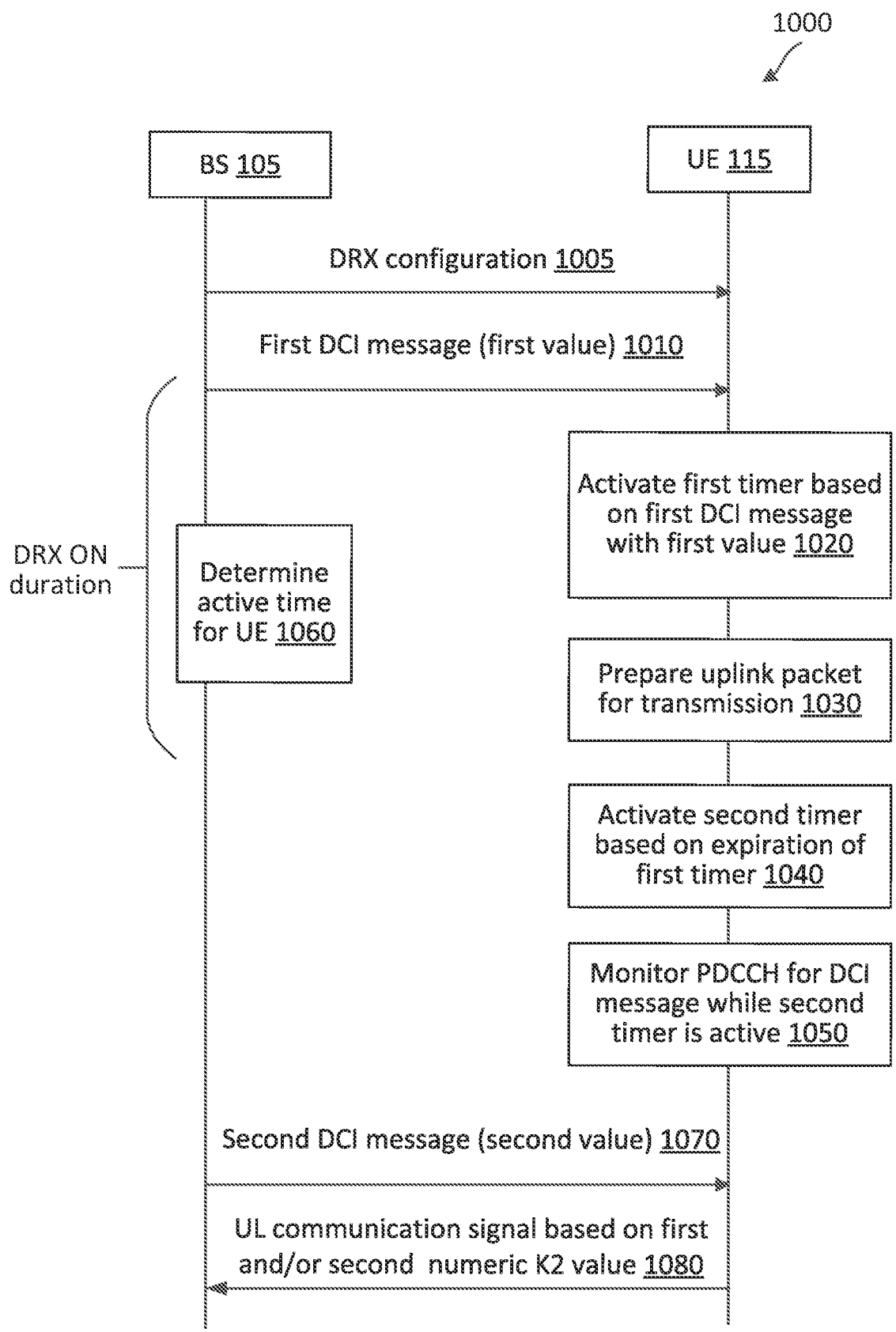
FIG. 10 is a sequence diagram illustrating an UL communication method that implements two-stage grant scheduling with DRX according to some aspects of the present disclosure.

FIG. 10 is a sequence diagram illustrating an UL communication method 1000 that implements two-stage grant scheduling with DRX according to some aspects of the present disclosure. The method 1000 may be implemented between a BS 105 and a UE 115. The method 1000 may employ similar mechanisms as described above in FIGS. 2-9. Although FIG. 10 illustrates one BS 105 and one UE 115, it should be understood that in other examples method 1000 can be implemented between the BS 105 and any suitable UEs 115 (e.g., 2, 3, 4, 5, 6 or more). As illustrated, the method 1000 includes a number of enumerated actions, but embodiments of the method 1000 may include additional actions before, after, and in between the enumerated actions. In some embodiments, one or more of the enumerated actions may be omitted or performed in a different order.

At action 1005, the BS 105 transmits a DRX configuration to the UE 115. The DRX configuration may indicate a DRX cycle similar to the DRX cycle 202 discussed above in relation to FIG. 2. The BS 105 may also include various timer configurations in the DRX configuration. For instance, the timer configuration may include a first timer value for the first timer and a second timer value for the second timer, where the first timer may be similar to the RTT UL timers 630 and 830. The timer configuration may also include an inactivity timer configuration and/or a retransmission DL timer configuration. The DRX configuration may also trigger the UE 115 to operate in a DRX mode according to the DRX cycle. In some aspects, the DRX configuration may be an RRC configuration.

At action 1010, the BS 105 transmits a first DCI message scheduling the UE 115 for an UL transmission (e.g., the PUSCH transmission 614). The first DCI message may be similar to the DCI message 610 discussed above in relation to FIG. 6. For instance, the first DCI message may be a first-stage UL grant indicating a first value for an UL schedule timing indicator. The first value may provide no timing information or partial timing information for the actual UL transmission. The first DCI message 610 may also indicate a resource (e.g., time-frequency resources spanning one or more symbol in time and one or more RBs in frequency) allocated for the PUSCH transmission 614 and/or a MCS. In some aspects, the BS 105 may transmit the first DCI message during a DRX on-duration (e.g., the DRX on-duration 204) of the DRX cycle. In some aspects, the UL transmission may be associated with a HARQ process identified by the HARQ ID.

At action 1020, upon receiving first DCI message, the UE 115 activates a first timer based on the first DCI message indicating the first value for the UL schedule timing indicator. The first timer may be similar to the RTT UL timer 630 or 830. In some aspects, the first timer is associated with the HARQ ID corresponding to the UL data transmission. In some aspects, the UE 115 may configure the first timer based on the timer configuration (e.g., drx-HARQ-RTT-TimerUL duration) configured by the DRX configuration. In some aspects, the UE 115 may activate the first time in a first symbol after receiving the first DCI message.

At action 1030, after activating the first timer, the UE 115 prepares an UL data packet for transmission, for example, based on a resource allocation size and/or a MCS indicated by the first DCI message.

At action 1040, upon an expiration of the first timer, the UE 115 activates a second timer. The second timer may be similar to the retransmission UL timer 640 or 840. In some aspects, the second timer is associated with the HARQ ID corresponding to the UL data transmission. In some aspects, the UE 115 may configure the second timer based on the timer configuration (e.g., drx-RetransmissionTimerUL duration) configured by the DRX configuration.

At action 1050, the UE 115 monitors for a PDCCH for DCI messages while the second timer is active. For instance, the UE 115 may receive a signal from the channel during a PDCCH monitoring period and perform blind decoding to determine whether a DCI message is successfully received.

At action 1060, after transmitting the first DCI message, the BS 105 determines an active time for the UE 115 to monitor PDCCH. The BS 105 may determine the active time in response to transmitting the first DCI message with the first value for the UL schedule timing indicator. In some aspects, the BS 105 may configure the UE 115 with the drx-HARQ-RTT-TimerUL duration and/or drx-RetransmissionTimerUL duration for the DRX mode and may determine the active time based on the drx-HARQ-RTT-TimerUL duration and/or drx-RetransmissionTimerUL duration.

At action 1070, the BS 105 transmits a second DCI message to the UE 115 indicating UL schedule timing for the UL transmission. The second DCI message may be similar to the DCI message 612 discussed above in relation to FIG. 6. For instance, the second DCI message may be a second-stage UL grant indicating a second value for the UL schedule timing. The BS 105 may determine a time to transmit the second DCI message based on the active time determined at action 1060. In some aspects, the BS 105 may transmit the first DCI message near an end of a first COT of the BS 105 (acquired by the BS 105 based on a successful CAT4 LBT) and may transmit the second DCI message near a start of a subsequent COT of the BS 105 (acquired by the BS 105 based on a successful CAT4 LBT). In some aspects, the first value in the first DCI message is a non-numeric K2 value and the second value in the second DCI message is a numeric K2 value indicating an offset from the DL slot where the second DCI message is transmitted to an UL slot where the UL transmission is to be transmitted. In some other aspects, the first value in the DCI message may include a UL schedule offset (a numeric K2 value) with respect to a reference time (e.g., slot) to be provided by the second value in the DCI second message.

At action 1080, upon receiving the second DCI message from the BS 105 from the monitoring, the UE 115 transmits an UL communication signal (e.g., the PUSCH transmission 614) to the BS 105 based on the first value and/or the second value. For instance, when the first value is a non-numeric value and the second value is a numeric K2 value, the UE 115 may transmit the UL transmission according to the second value (e.g., at a time offset as indicated by the second value from the slot where second DCI message is received). Alternatively, when the first value is a numeric K2 value with respect to the second value, the UE may transmit the UL transmission according to the first value and the second value (e.g., at a time offset as indicated by the first value from the slot indicated by the second value). The UL communication signal may carry the TB prepared at action 1030. In some aspects, the UE 115 may deactivate the second timer upon receiving the second DCI message.

In some aspects, the BS 105 may transmit the first DCI message with multiple repetitions at action 1010 and the UE 115 may activate the first timer after receiving a last repetition of the first DCI message at action 1020, for example, as discussed above in relation to FIGS. 8 and 9.

Figure 11:
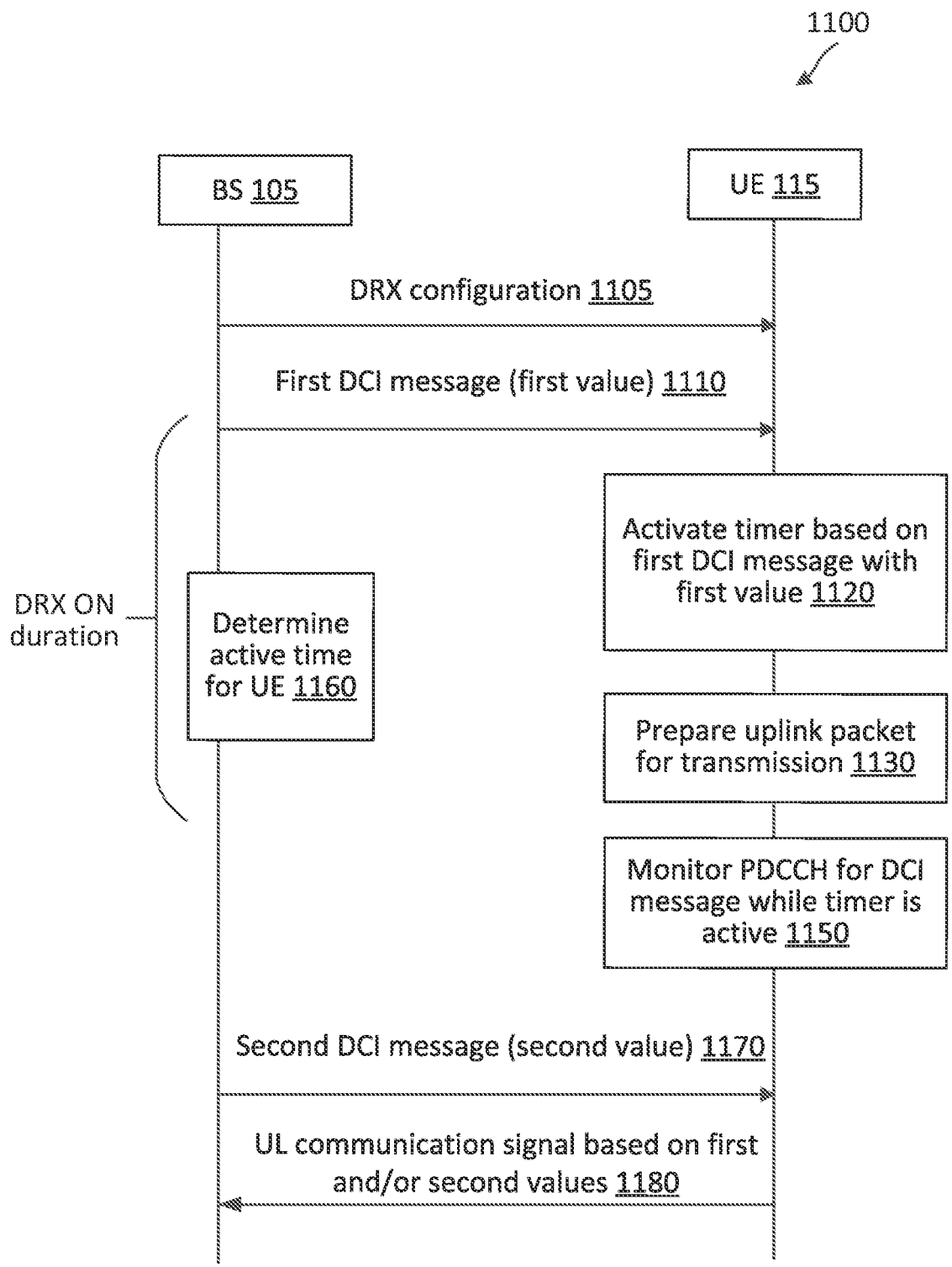
FIG. 11 is a sequence diagram illustrating an UL communication method that implements two-stage grant scheduling with DRX according to some aspects of the present disclosure.

FIG. 11 is a sequence diagram illustrating an UL communication method 1100 that implements two-stage grant scheduling with DRX according to some aspects of the present disclosure. The method 1000 may be implemented between a BS 105 and a UE 115. The method 1100 may employ similar mechanisms as described above in FIGS. 2-10. Although FIG. 11 illustrates one BS 105 and one UE 115, it should be understood that in other examples method 1100 can be implemented between the BS 105 and any suitable UEs 115 (e.g., 2, 3, 4, 5, 6 or more). As illustrated, the method 1100 includes a number of enumerated actions, but embodiments of the method 1100 may include additional actions before, after, and in between the enumerated actions. In some embodiments, one or more of the enumerated actions may be omitted or performed in a different order.

Generally speaking, the method 1100 includes features similar to method 1000 in many respects. For example, actions 1105, 1110, 1130, 1150, 1160, 1170, and 1180 are similar to actions 1005, 1010, 1030, 1050, 1060, 1070, and 1080, respectively. Accordingly, for sake of brevity, details of those steps will not be repeated here.

At action 1105, the BS 105 transmits a DRX configuration to the UE 115, for example, as discussed above in relation to action 1005.

At action 1110, the BS 105 transmits a first DCI message scheduling the UE 115 for an UL transmission (e.g., the PUSCH transmission 614). The first DCI message may be a first-stage UL grant indicating a first value for an UL schedule timing indicator, for example, as discussed above in relation to action 1010.

At action 1120, upon receiving first DCI message, the UE 115 activates a timer based on the first DCI message indicating the first value for the UL schedule timing indicator. The timer may be similar to the retransmission UL timer 640 or 840. In some aspects, the UE 115 may activate the timer in a first symbol after receiving the first DCI message.

At action 1130, after activating the timer, the UE 115 prepares an UL data packet for transmission, for example, as discussed above in relation to action 1030.

At action 1150, the UE 115 monitors for a PDCCH for DCI messages while the timer is active, for example, as discussed above in relation to action 1050.

At action 1160, after transmitting the first DCI message, the BS 105 determines an active time for the UE 115 to monitor PDCCH. For example, the BS 105 may configure the UE 115 with a drx-RetransmissionTimerUL duration for the DRX mode and may determine the active time based on drx-RetransmissionTimerUL duration.

At action 1170, the BS 105 transmits a second DCI message to the UE 115 indicating UL schedule timing for the UL transmission, for example, as discussed above in relation to action 1070. The second DCI message may be a second-stage UL grant indicating a second value for the UL schedule timing, as discussed above in relation to action 1070.

At action 1180, upon receiving the second DCI message from the BS 105 from the monitoring, the UE 115 transmits an UL communication signal (e.g., the PUSCH transmission 614) to the BS 105 based on the first value and/or the second value as discussed above in relation to action 1080. For instance, when the first value is a non-numeric K2 value and the second value is a numeric K2 value, the UE 115 may transmit the UL transmission according to the second value. Alternatively, when the first value is a numeric K2 value with respect to the second value, the UE may transmit the UL transmission according to the first value and the second value.

In some aspects, the BS 105 may transmit the first DCI message with multiple repetitions at action 1110 and the UE 115 may activate the first timer after receiving a last repetition of the first DCI message at action 1120, for example, as discussed above in relation to FIGS. 8 and 9.

Figure 12:
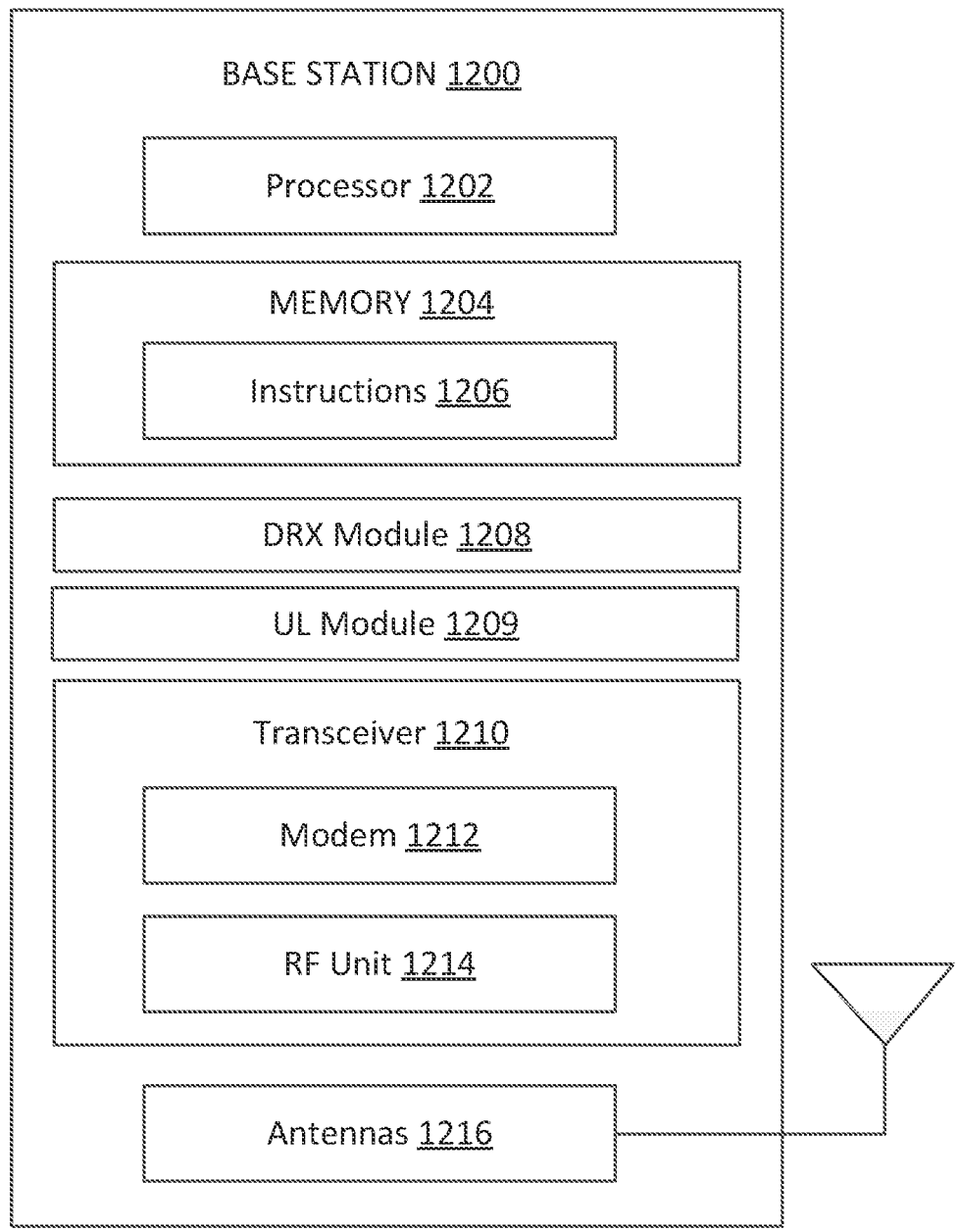
FIG. 12 is a block diagram of an exemplary base station (BS) according to some aspects of the present disclosure.

FIG. 12 is a block diagram of an exemplary BS 1200 according to some aspects of the present disclosure. The BS 1200 may be a BS 105 in the network 100 as discussed above in FIG. 1. As shown, the BS 1200 may include a processor 1202, a memory 1204, an DRX module 1208, an UL module 1209, a transceiver 1210 including a modem subsystem 1212 and a RF unit 1214, and one or more antennas 1216. These elements may be coupled with each other and in direct or indirect communication with each other, for example via one or more buses.

The processor 1202 may have various features as a specific-type processor. For example, these may include a CPU, a DSP, an ASIC, a controller, a FPGA device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1204 may include a non-transitory computer-readable medium. The memory 1204 may store instructions 1206. The instructions 1206 may include instructions that, when executed by the processor 1202, cause the processor 1202 to perform operations described herein, for example, aspects of FIGS. 2-11. Instructions 1206 may also be referred to as program code. The program code may be for causing a wireless communication device to perform these operations, for example by causing one or more processors (such as processor 1202) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the DRX module 1208 and the UL module 1209 may be implemented via hardware, software, or combinations thereof. For example, each of the DRX module 1208 and the UL module 1209 may be implemented as a processor, circuit, and/or instructions 1206 stored in the memory 1204 and executed by the processor 1202. In some examples, the DRX module 1208 and the UL module 1209 can be integrated within the modem subsystem 1212. For example, the DRX module 1208 and the UL module 1209 can be implemented by a combination of software components (e.g., executed by a DSP or a general processor) and hardware components (e.g., logic gates and circuitry) within the modem subsystem 1212. In some examples, a BS may include one of the DRX module 1208 and the UL module 1209. In other examples, a BS may include both the DRX module 1208 and the UL module 1209.

The DRX module 1208 and the UL module 1209 may be used for various aspects of the present disclosure, for example, aspects of FIGS. 2-11. In some aspects, the DRX module 1208 is configured to transmit a DRX configuration to a UE (e.g., the UEs 115) and configure the UE to operate in DRX mode. The DRX configuration may indicate a DRX cycle, a starting time of the DRX cycle, a periodicity of the DRX cycle, an on-duration of the DRX cycle, and/or timer configurations for a set of timers that the UE may utilize to maintain in an active state while operating in the DRX mode. The set of timers may include an activity timer, an RTT timer for DL HARQ, a retransmission timer for DL HARQ, an RTT timer for UL HARQ, and/or a retransmission timer for UL HARQ.

In some aspects, the UL module 1209 is configured to transmit a first DCI message (e.g., the DCI message 610) to schedule the UE for an UL data transmission (e.g., the PUSCH transmission 614). The first DCI message may be a first-stage UL grant indicating a first value for an UL schedule timing indicator. The first value may provide no timing information or partial timing information for the actual UL transmission. The UL module 1209 is further configured to determine, based on the UL schedule timing indicator having a non-numeric value, an active time that the UE may monitor a DL control channel (e.g., a PDCCH) after receiving first DCI message. For instance, the UL module 1209 is configured to determine the active time of the UE based on an RTT timer configuration (e.g., the RTT UL timers 630 and/or 830) and/or a retransmission timer configuration (e.g., the retransmission UL timers 640, 740, 840, and/or 940) of the UE. The UL module 1209 is further configured to, transmit a second DCI message to the UE based on the active time for the UE to monitor the DL control channel. The second DCI message may be a second-stage UL grant including UL schedule timing for the UL data transmission. The second DCI message may include a second value for the UL schedule timing. The UL module 1209 is further configured to receive the UL data transmission from the UE at a scheduled time based on the first value in first DCI message and the second value in the second DCI message or based on the second value in the second DCI message as discussed above with respect to FIGS. 6-11.

As shown, the transceiver 1210 may include the modem subsystem 1212 and the RF unit 1214. The transceiver 1210 can be configured to communicate bi-directionally with other devices, such as the UEs 115 and/or another core network element. The modem subsystem 1212 may be configured to modulate and/or encode data according to a MCS, e.g., a LDPC coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., RRC configuration, DRX configuration, PDCCH DCI) from the modem subsystem 1212 (on outbound transmissions) or of transmissions originating from another source such as a UE 115. The RF unit 1214 may be further configured to perform analog beamforming in conjunction with the digital beamforming. Although shown as integrated together in transceiver 1210, the modem subsystem 1212 and/or the RF unit 1214 may be separate devices that are coupled together at the BS 105 to enable the BS 105 to communicate with other devices.

The RF unit 1214 may provide the modulated and/or processed data, e.g. data packets (or, more generally, data messages that may contain one or more data packets and other information), to the antennas 1216 for transmission to one or more other devices. This may include, for example, transmission of information to complete attachment to a network and communication with a camped UE 115 according to some aspects of the present disclosure. The antennas 1216 may further receive data messages transmitted from other devices and provide the received data messages for processing and/or demodulation at the transceiver 1210. The transceiver 1210 may provide the demodulated and decoded data (e.g., PUSCH data, PUCCH control information) to the DRX module 1208 and UL module 1209 for processing. The antennas 1216 may include multiple antennas of similar or different designs in order to sustain multiple transmission links.

In some aspects, the transceiver 1210 is configured to communicate with other components of the BS 1200 to transmit, to a UE, a first DCU message scheduling an UL data transmission, where the first DCI message indicates a first value for an UL schedule timing indicator. The processor 1202 is configured to communicate with other components of the BS 1200 to determine, based at least in part on the first value of the UL scheduling timing indicator, an active time for the UE to monitor a DL control channel. The transceiver 1210 is further configured to communicate with other components of the BS 1200 to transmit, to the UE based on the active time for the UE to monitor the DL control channel, a second DCI message indicating UL schedule timing for the UL data transmission.

In an aspect, the BS 1200 can include multiple transceivers 1210 implementing different RATs (e.g., NR and LTE). In an aspect, the BS 1200 can include a single transceiver 1210 implementing multiple RATs (e.g., NR and LTE). In an aspect, the transceiver 1210 can include various components, where different combinations of components can implement different RATs.

Figure 13:
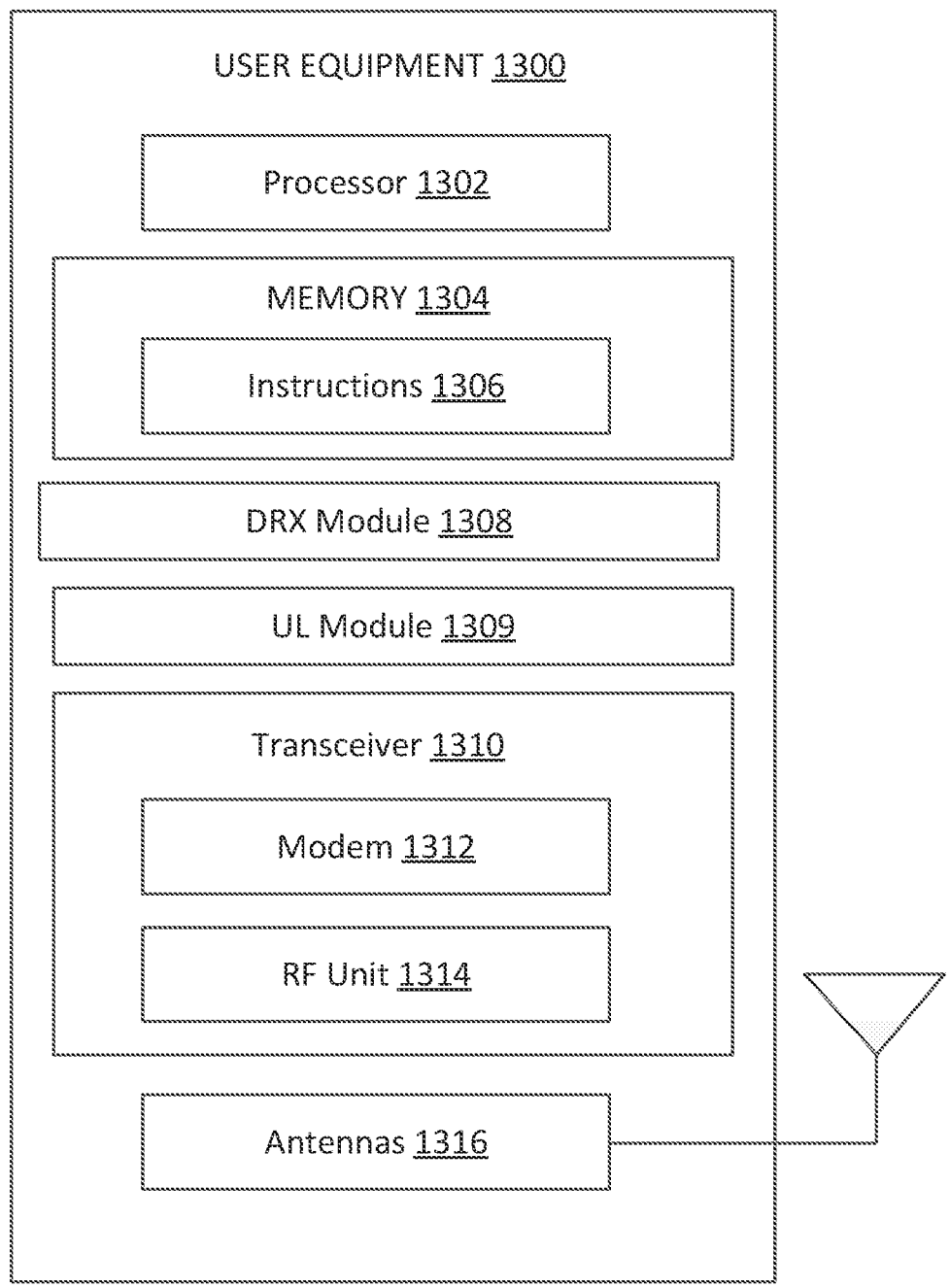
FIG. 13 is a block diagram of an exemplary user equipment (UE) according to some aspects of the present disclosure.

FIG. 13 is a block diagram of an exemplary UE 1300 according to some aspects of the present disclosure. The UE 1300 may be a UE 115 as discussed above with respect to FIG. 1. As shown, the UE 1300 may include a processor 1302, a memory 1304, an DRX module 1308, an UL module 1309, a transceiver 1310 including a modem subsystem 1312 and a radio frequency (RF) unit 1314, and one or more antennas 1316. These elements may be coupled with each other and in direct or indirect communication with each other, for example via one or more buses.

The processor 1302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1304 includes a non-transitory computer-readable medium. The memory 1304 may store, or have recorded thereon, instructions 1306. The instructions 1306 may include instructions that, when executed by the processor 1302, cause the processor 1302 to perform the operations described herein with reference to the UEs 115 in connection with aspects of the present disclosure, for example, aspects of FIGS. 2-11. Instructions 1306 may also be referred to as program code, which may be interpreted broadly to include any type of computer-readable statement(s) as discussed above with respect to FIG. 12.

Each of the DRX module 1308 and the UL module 1309 may be implemented via hardware, software, or combinations thereof. For example, each of the DRX module 1308 and the UL module 1309 may be implemented as a processor, circuit, and/or instructions 1306 stored in the memory 1304 and executed by the processor 1302. In some examples, the DRX module 1308 and the UL module 1309 can be integrated within the modem subsystem 1312. For example, the DRX module 1308 and the UL module 1309 can be implemented by a combination of software components (e.g., executed by a DSP or a general processor) and hardware components (e.g., logic gates and circuitry) within the modem subsystem 1312. In some examples, a BS may include one of the DRX module 1308 and the UL module 1309. In other examples, a BS may include both the DRX module 1308 and the UL module 1309.

The DRX module 1308 and the UL module 1309 may be used for various aspects of the present disclosure, for example, aspects of FIGS. 2-11. In some aspects, the DRX module 1308 is configured to receive a DRX configuration from a BS (e.g., the BSs 105. The DRX configuration may indicate a DRX cycle, a starting time of the DRX cycle, a periodicity of the DRX cycle, an on-duration of the DRX cycle, and/or timer configurations for a set of timers. For example, the set of timers may include an activity timer, an RTT timer for DL HARQ, retransmission timer for DL HARQ, an RTT timer for UL HARQ, and/or a retransmission timer for UL HARQ. The DRX module 1308 is further configured to operate in the DRX mode according to the DRX configuration, for example, maintaining an active state and monitoring a PDCCH while any one of the timers is active, entering a low power state and refraining from monitoring a PDCCH when no timer in the set is active, and waking up to monitor a PDCCH according to the DRX on-duration as discussed above in relation to FIGS. 2-9.

In some aspects the UL module 1309 is configured to receive, from a BS (e.g., the BSs 105 and/or 1200), a first DCI message (e.g., the DCI message 610) scheduling an UL data transmission. The first DCI message indicates a first value for an UL schedule timing indicator. The first value may provide no timing information or partial timing information for the actual UL transmission. The UL module 1309 is further configured to activate a timer based at least in part on the first value of the UL schedule timing indicator and monitor a DL control channel (e.g., a PDCCH) based at least in part on the timer. In some aspects, the timer is a RTT UL timer and the UL module 1309 is further configured to activate a retransmission UL timer upon an expiration of the RTT UL timer as discussed above in relation to FIGS. 6, 8, and 10. In some other aspects, the timer is a retransmission UL timer as discussed above in relation to FIGS. 7, 9, and 11. The UL module 1309 is further configured to receive, from the BS, a second DCI message (e.g., the DCI message 612) indicating UL schedule timing for the UL data transmission based at least in part on the monitoring. In some aspects, the second DCI message indicates a second value for the UL schedule timing. Accordingly, the UL module 1309 is further configured to transmit, to the BS, the UL data transmission at a scheduled time based on the first value in first DCI message and the second value in the second DCI message or based on the second value in the second DCI message as discussed above with respect to FIGS. 6-11.

As shown, the transceiver 1310 may include the modem subsystem 1312 and the RF unit 1314. The transceiver 1310 can be configured to communicate bi-directionally with other devices, such as the BSs 105. The modem subsystem 1312 may be configured to modulate and/or encode the data from the memory 1304 and/or the DRX module 1308 according to a modulation and coding scheme (MCS), e.g., a low-density parity check (LDPC) coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data (e.g., PUSCH data, PUCCH control information) from the modem subsystem 1312 (on outbound transmissions) or of transmissions originating from another source such as a UE 115 or a BS 105. The RF unit 1314 may be further configured to perform analog beamforming in conjunction with the digital beamforming. Although shown as integrated together in transceiver 1310, the modem subsystem 1312 and the RF unit 1314 may be separate devices that are coupled together at the UE 115 to enable the UE 115 to communicate with other devices.

The RF unit 1314 may provide the modulated and/or processed data, e.g. data packets (or, more generally, data messages that may include one or more data packets and other information), to the antennas 1316 for transmission to one or more other devices. The antennas 1316 may further receive data messages transmitted from other devices. The antennas 1316 may provide the received data messages for processing and/or demodulation at the transceiver 1310. The transceiver 1310 may provide the demodulated and decoded data (e.g., RRC configuration, DRX configuration, PDCCH DCI) to the DRX module 1308 for processing. The antennas 1316 may include multiple antennas of similar or different designs in order to sustain multiple transmission links. The RF unit 1314 may configure the antennas 1316.

In some aspects, the transceiver 1310 is configured to communicate with other components of the UE 1300 to receive, from a BS, a first DCI message scheduling an UL data transmission, where the first DCI message indicates a first value for an UL schedule timing indicator. The processor 1302 is configured to communicate with other components of the UE 1300 to activate a timer based at least in part on the first value of the UL schedule timing indicator and monitor a DL control channel based at least in part on the timer. The transceiver 1310 is further configured to communicate with other components of the UE 1300 to receive, from the BS, a second DCI message indicating UL schedule timing for the UL data transmission based at least in part on the monitoring and transmit the UL data transmission according to the UL schedule timing.

In an aspect, the UE 1300 can include multiple transceivers 1310 implementing different RATs (e.g., NR and LTE). In an aspect, the UE 1300 can include a single transceiver 1310 implementing multiple RATs (e.g., NR and LTE). In an aspect, the transceiver 1310 can include various components, where different combinations of components can implement different RATs.

Figure 14:
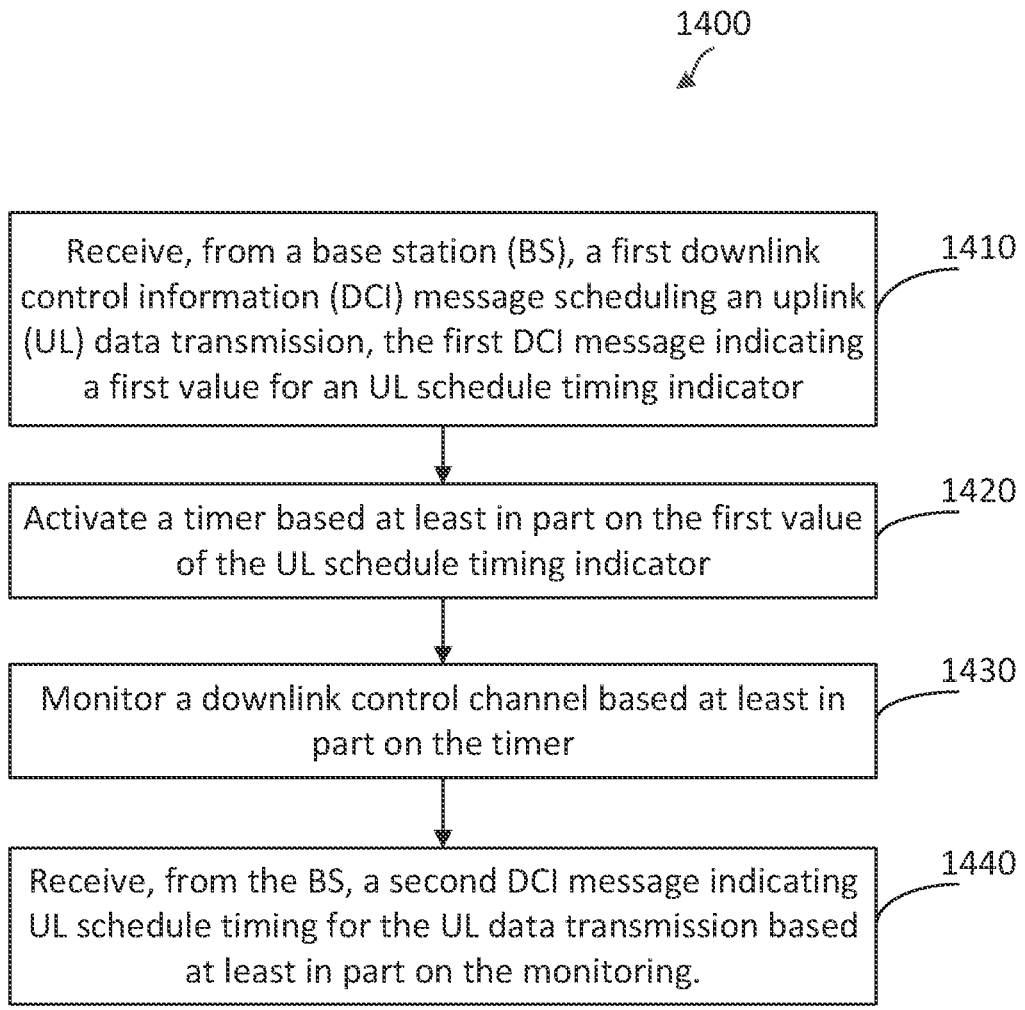
FIG. 14 is a flow diagram of a wireless communication method according to some aspects of the present disclosure.

FIG. 14 is a flow diagram of a wireless communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as a UE 115, may utilize one or more components, such as the processor 1302, the memory 1304, the DRX module 1308, the UL module 1309, the transceiver 1310, the modem 1312, and the one or more antennas 1316, to execute the steps of method 1400. The method 1400 may employ similar mechanisms as described above in FIGS. 2-11. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, a UE (e.g., the UE 115) receives, from a BS (e.g., the BS 105), a first DCI message (e.g., the DCI message 610) scheduling an UL data transmission, where the first DCI message indicates a first value for an UL schedule timing indicator. In some aspects, the UE may receive one or more repetitions of the first DCI message, a number of repetitions being based on a configuration. In some aspects, the UE may utilize one or more components, such as the processor 1302, the DRX module 1308, the UL module 1309, the transceiver 1310, the modem 1312, the one or more antennas 1316 to perform the operations of block 1410.

At block 1420, the UE activates a timer based at least in part on the first value of the UL schedule timing indicator. In some aspects, the timer is associated with a HARQ ID corresponding to the UL data transmission. In some aspects, the UE may utilize one or more components, such as the processor 1302, the DRX module 1308, the UL module 1309, the transceiver 1310, the modem 1312, the one or more antennas 1316 to perform the operations of block 1420.

In some aspects, the timer at block 1420 may be retransmission timer associated with the HARQ ID as discussed above in relation to FIGS. 7, 9, and 11. The UE may active the retransmission timer based on a drx-RetransmissionTimerUL duration. In some aspects, the UE may active the retransmission timer in a first symbol after receiving the first DCI message. In some aspects, when the UE receives one or more repetitions of the first DCI message at block 1410, the UE may activate the retransmission timer based on a determination that a last repetition of the first DCI message is received.

In some aspects, the timer is a round-trip timer associated with the HARQ ID as discussed above in relation to FIGS. 6, 8, and 10. The UE may activate the timer further based on a drx-HARQ-RTT-TimerUL duration. In some aspects, the UE may activate the round-trip timer in a first symbol after receiving the first DCI message. In some aspects, when the UE receives one or more repetitions of the first DCI message at block 1410, the UE may activate the round-trip timer based on a determination that a last repetition of the first DCI message is received. Upon an expiry of the round-trip timer, the UE may activate a retransmission timer associated with the HARQ ID as discussed above in relation to FIGS. 6, 8, and 10. The UE may activate the retransmission timer based on a drx-RetransmissionTimerUL duration.

At block 1430, the UE monitors a DL control channel based at least in part on the timer. For instance, when the timer is a retransmission timer, the UE may monitor the DL control channel while the retransmission timer is active. Alternatively, when the timer is a round-trip timer, the UE may activate retransmission timer based on an expiration of the round-trip timer and monitor the DL control channel while the retransmission timer is active. In some aspects, the UE may utilize one or more components, such as the processor 1302, the DRX module 1308, the UL module 1309, the transceiver 1310, the modem 1312, the one or more antennas 1316 to perform the operations of block 1430.

At block 1440, the UE receives, from the BS, a second DCI message (e.g., the DCI message 612) indicating UL schedule timing for the UL data transmission based at least in part on the monitoring. In some aspects, the second DCI message indicates a second value for the UL schedule timing. In some aspects, the first value is a non-numeric K2 value and the second value is a numeric K2 value. Accordingly, the UE may transmit the UL data transmission according to the second value (e.g., at an offset corresponding to the second value from the second DCI message). In some other aspects, the first value is a numeric K2 value with respect to the second value. Accordingly, the UE may transmit the UL data transmission according to the first value and the second value (e.g., at an offset corresponding to the first value with respect to the second value). In some aspects, the UE may utilize one or more components, such as the processor 1302, the DRX module 1308, the UL module 1309, the transceiver 1310, the modem 1312, the one or more antennas 1316 to perform the operations of block 1440.

In some aspects, the UE may deactivate the timer based at least in part on the timer running for an active duration of the timer. The UE may enter a low power mode based at least in part on deactivating the timer. The UE may refrain from monitoring the DL control channel while in the low power mode. In some aspects, the UE may deactivate the timer further based on receiving the second DCI message. In some aspects, the UE may enter the low power mode based at least in part on the UE being outside of an on-duration of a DRX mode and each timer corresponding to monitoring the DL control channel being deactivated.

In some aspects, the UE may operate based on a DRX mode and monitor the DL control channel during an on-duration of the DRX mode. In some aspects, the first DCI message received at block 1410 may be received while the UE monitors the DL control channel during the on-duration.

Figure 15:
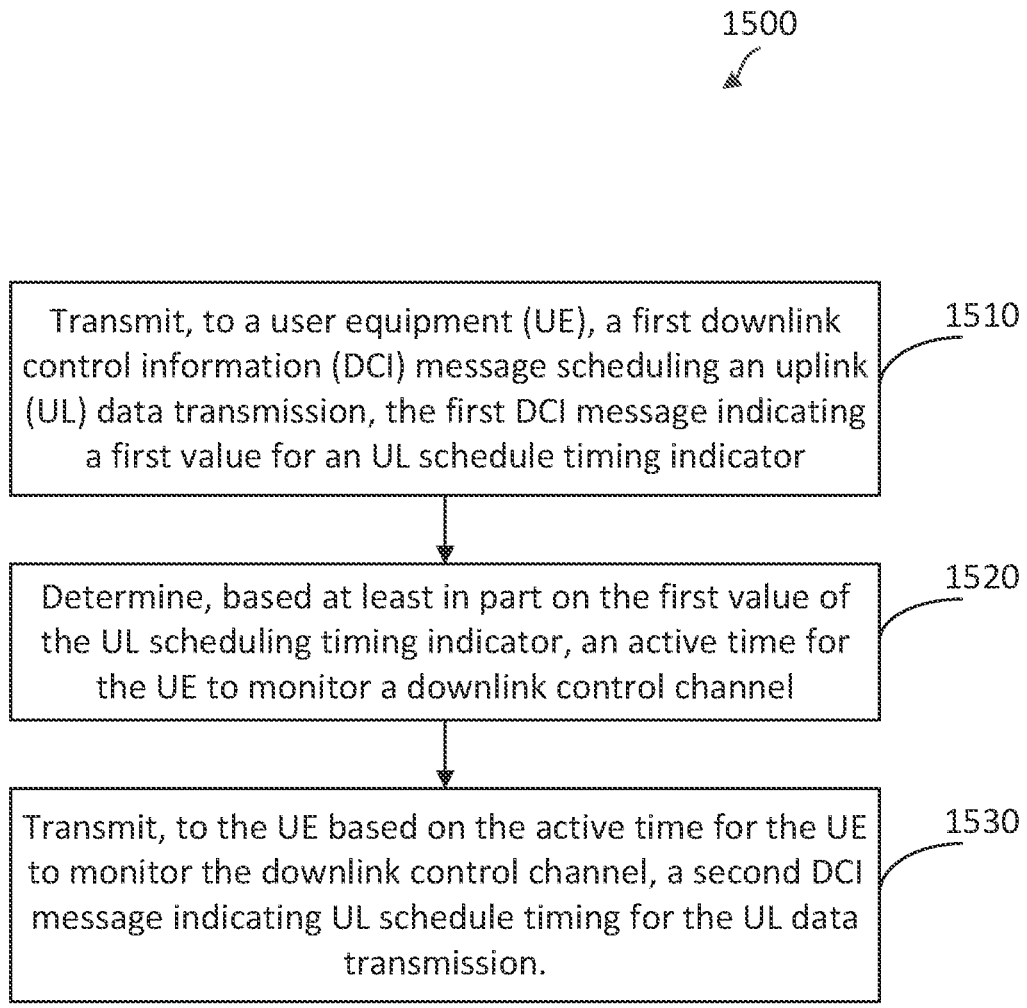
FIG. 15 is a flow diagram of a wireless communication method according to some aspects of the present disclosure.

FIG. 15 is a flow diagram of a wireless communication method 1500 according to some aspects of the present disclosure. Aspects of the method 1500 can be executed by a computing device (e.g., a processor, processing circuit, and/or other suitable component) of a wireless communication device or other suitable means for performing the steps. For example, a wireless communication device, such as a BS 105, may utilize one or more components, such as the processor 1202, the memory 1204, the DRX module 1208, the UL module 1209, the transceiver 1210, the modem 1212, and the one or more antennas 1216, to execute the steps of method 1500. The method 1500 may employ similar mechanisms as described above in FIGS. 2-11. As illustrated, the method 1500 includes a number of enumerated steps, but aspects of the method 1500 may include additional steps before, after, and in between the enumerated steps. In some aspects, one or more of the enumerated steps may be omitted or performed in a different order.

At block 1510, a BS (e.g., the BSs 105) transmits, to a UE (e.g., the UEs 115), a first DCI message (e.g., the DCI messages 610) scheduling an UL data transmission. The first DCI message indicates a first value for an UL schedule timing indicator. In some aspects, the BS may utilize one or more components, such as the processor 1202, the DRX module 1208, the UL module 1209, the transceiver 1210, the modem 1212, the one or more antennas 1216 to perform the operations of block 1510.

At block 1520, the BS determines, based at least in part on the first value of the UL scheduling timing indicator, an active time for the UE to monitor a DL control channel. In some aspects, the BS may utilize one or more components, such as the processor 1202, the DRX module 1208, the UL module 1209, the transceiver 1210, the modem 1212, the one or more antennas 1216 to perform the operations of block 1520.

At block 1530, the BS transmits, to the UE based on the active time for the UE to monitor the DL control channel, a second DCI message (e.g., the DCI messages 612) indicating UL schedule timing for the UL data transmission. In some aspects, the second DCI message indicates a second value for the UL schedule timing. In some aspects, the first value is a non-numeric K2 value and the second value is a numeric K2 value. Accordingly, the BS may receive the UL data transmission according to the second value (e.g., at an offset corresponding to the second value from the second DCI message). In some other aspects, the first value is a numeric K2 value with respect to the second value. Accordingly, the BS may receive the UL data transmission according to the first value and the second value (e.g., at an offset corresponding to the first value with respect to the second value). In some aspects, the BS may utilize one or more components, such as the processor 1202, the DRX module 1208, the UL module 1209, the transceiver 1210, the modem 1212, the one or more antennas 1216 to perform the operations of block 1530.

In some aspects, the BS may further activate a timer in a first symbol after transmitting the first DCI message, where the determining the active time for the UE to monitor the DL control channel at block 1520 may be further based on the timer. In some aspects, the BS may activate the timer based on at least one of a retransmission time duration or a round-trip time duration associated with a HARQ process for the UL data transmission. For instance, the BS may configure the UE with at least one of the retransmission time duration (e.g., drx-RetransmissionTimerUL duration) or the round-trip time duration (e.g., drx-HARQ-RTT-TimerUL duration). In some aspects, the BS may activate the timer based on the retransmission time duration and a round-trip time duration.

Further aspects of the present disclosure include the following.

Aspect 1 includes a method of wireless communication performed by a user equipment (UE), the method comprising receiving, from a base station (BS), a first downlink control information (DCI) message scheduling an uplink (UL) data transmission, the first DCI message indicating a first value for an UL schedule timing indicator; activating a timer based at least in part on the first value of the UL schedule timing indicator; monitoring a downlink control channel based at least in part on the timer; and receiving, from the BS, a second DCI message indicating UL schedule timing for the UL data transmission based at least in part on the monitoring.

Aspect 2 includes the method of aspect 1, wherein the timer is associated with a hybrid automatic repeat request (HARQ) identifier (ID) corresponding to the UL data transmission.

Aspect 3 includes the method of aspect 2, wherein the activating the timer comprises activating a retransmission timer associated with the HARQ ID.

Aspect 4 includes the method of aspect 3, wherein the activating the timer further comprises activating the retransmission timer based on a drx-RetransmissionTimerUL duration.

Aspect 5 includes the method of any of aspects 3-4, wherein the activating the timer further comprise activating the retransmission timer in a first symbol after receiving the first DCI message; and the monitoring the downlink control channel comprises monitoring the downlink control channel while the retransmission timer is active.

Aspect 6 includes the method f any of aspects 3-5, further comprising deactivating the retransmission timer based on receiving the second DCI message.

Aspect 7 includes the method f any of aspects 3-6, wherein the receiving the first DCI message comprises receiving one or more repetitions of the first DCI message, a number of repetitions being based on a configuration; and the activating the timer further comprises activating the retransmission timer based on a determination that a last repetition of the first DCI message is received.

Aspect 8 includes the method of aspect 2, wherein the activating the timer comprises activating a round-trip time timer associated with the HARQ ID.

Aspect 9 includes the method of aspect 8, further comprising activating a retransmission timer associated with the HARQ ID based on an expiration of the round-trip time timer, wherein the monitoring the downlink control channel comprises monitoring the downlink control channel while the retransmission timer is active.

Aspect 10 includes the method of aspect 9, wherein the activating the timer is further based on a drx-HARQ-RTT-TimerUL duration; and the activating the retransmission timer further comprises activating the retransmission timer based on a drx-RetransmissionTimerUL duration.

Aspect 11 includes the method of any of aspects 9-10, further comprising deactivating the retransmission timer based on receiving the second DCI message.

Aspect 12 includes the method of any of aspects 9-11, wherein the activating the timer further comprises activating the round-trip time timer in a first symbol after receiving the first DCI message.

Aspect 13 includes the method of any of aspects 9-12, wherein the receiving the first DCI message comprises receiving one or more repetitions of the first DCI message, a number of repetitions being based on a configuration; and the activating the timer further comprises activating the round-trip time timer based on a determination that a last repetition of the first DCI message is received.

Aspect 14 includes the method of any of aspects 1-13, wherein the second DCI message indicates a second value for the UL schedule timing; and the method further comprises transmitting, to the BS, the UL data transmission based at least in part on the second value or a combination of the first value for the UL schedule timing indicator and the second value.

Aspect 15 includes the method of any of aspects 1-14, further comprising deactivating the timer based at least in part on the timer running for an active duration of the timer; entering a low power mode based at least in part on deactivating the timer; and refraining from monitoring the downlink control channel while in the low power mode.

Aspect 16 includes the method of any of aspects 1-15, wherein the deactivating the timer is further based on receiving the second DCI message.

Aspect 17 includes the method of any of aspects 1-16, wherein the entering the low power mode is further based at least in part on the UE being outside of an on-duration of a discontinuous reception (DRX) mode and each timer corresponding to monitoring the downlink control channel being deactivated.

Aspect 18 includes the method of any of aspects 1-17, further comprising operating based on a discontinuous reception (DRX) mode; and monitoring the downlink control channel during an on-duration of the DRX mode, wherein the receiving the first DCI message comprises receiving, based at least in part on monitoring the downlink control channel during the on-duration, the first DCI message.

Aspect 19 includes the method of any of aspects 1-18, wherein the activating the timer comprises activating the timer in a first symbol after receiving the first DCI message.

Aspect 20 includes a method of wireless communication performed by a base station (BS), the method comprising transmitting, to a user equipment (UE), a first downlink control information (DCI) message scheduling an uplink (UL) data transmission, the first DCI message indicating a first value for an UL schedule timing indicator; determining, based at least in part on the first value of the UL scheduling timing indicator, an active time for the UE to monitor a downlink control channel; and transmitting, to the UE based on the active time for the UE to monitor the downlink control channel, a second DCI message indicating UL schedule timing for the UL data transmission.

Aspect 21 includes the method of aspect 20, further comprising activating a timer in a first symbol after transmitting the first DCI message, wherein the determining the active time for the UE to monitor the downlink control channel is further based on the timer.

Aspect 22 includes the method of aspect 21, wherein the activating the timer is further based on at least one of a retransmission time duration or a round-trip time duration associated with a hybrid automatic repeat request (HARQ) process for the UL data transmission.

Aspect 23 includes the method of aspect 22, wherein the activating the timer is further based on the retransmission time duration and the round-trip time duration.

Aspect 24 includes the method of any of aspects 22-23, wherein the retransmission time duration comprises a drx-RetransmissionTimerUL duration.

Aspect 25 includes the method of any of aspects 22-23, wherein the round-trip time duration comprises a drx-HARQ-RTT-TimerUL duration.

Aspect 26 includes the method of any of aspects 22-23, wherein the second DCI message indicates a second value for the UL schedule timing; and the method further comprises receiving, from the UE, the UL data transmission based at least in part on the second value or a combination of the first value for the UL schedule timing indicator and the second value.

Aspect 27 includes the method of any of aspects 22-23, wherein the transmitting the first DCI message comprises transmitting one or more repetitions of the first DCI message, a number of repetitions being based on a configuration; and the determining the active time is further based on a last repetition of the first DCI message.

One aspect includes an apparatus comprising a processor coupled to a transceiver, wherein the processor and transceiver are configured to perform the method of any one of aspects 1-19.

Another aspect includes an apparatus comprising means for performing the method of any one of aspects 1-19.

Another aspect includes a non-transitory computer readable medium including program code, which when executed by one or more processors, causes a wireless communication device to perform the method of any one of aspect 1-19.

Another aspect includes an apparatus comprising a processor coupled to a transceiver, wherein the processor and transceiver are configured to perform the method of any one of aspects 20-27.

Another aspect includes an apparatus comprising means for performing the method of any one of aspects 20-27.

Another aspect includes a non-transitory computer readable medium including program code, which when executed by one or more processors, causes a wireless communication device to perform the method of any one of aspect 20-27.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
receiving, from a base station (BS), one or more repetitions of a first downlink control information (DCI) message scheduling an uplink (UL) data transmission, the first DCI message indicating a first value for an UL schedule timing indicator;
activating a timer based at least in part on the first value of the UL schedule timing indicator and a determination that a last repetition of the one or more repetitions of the first DCI message is received;
monitoring a downlink control channel based at least in part on the timer; and
receiving, from the BS, a second DCI message indicating UL schedule timing for the UL data transmission based at least in part on the monitoring.

2. The method of claim 1, wherein the timer is associated with a hybrid automatic repeat request (HARQ) identifier (ID) corresponding to the UL data transmission.

3. The method of claim 2, wherein the activating the timer comprises:
activating a retransmission timer associated with the HARQ ID.

4. The method of claim 3, wherein:
the activating the timer further comprises:
activating the retransmission timer in a first symbol after receiving the first DCI message; and
the monitoring the downlink control channel comprises:
monitoring the downlink control channel while the retransmission timer is active.

5. The method of claim 3, further comprising:
deactivating the retransmission timer based on receiving the second DCI message.

6. The method of claim 3, wherein:
the activating the timer further comprises:
activating a round-trip time timer associated with the HARQ ID; and
activating the retransmission timer based on an expiration of the round-trip time timer; and
the monitoring the downlink control channel comprises:
monitoring the downlink control channel while the retransmission timer is active.

7. The method of claim 6, wherein the activating the timer further comprises:
activating the round-trip time timer in a first symbol after receiving the first DCI message.

8. The method of claim 6, wherein:
the receiving the one or more repetitions of the first DCI message comprises:
receiving the one or more repetitions of the first DCI message based on a configuration; and
the activating the timer further comprises:
activating the round-trip time timer based on a determination that a last repetition of the one or more repetitions of the first DCI message is received.

9. The method of claim 1, wherein:
the second DCI message indicates a second value for the UL schedule timing; and
the method further comprises:
transmitting, to the BS, the UL data transmission based at least in part on the second value or a combination of the first value for the UL schedule timing indicator and the second value.

10. The method of claim 1, further comprising:
operating based on a discontinuous reception (DRX) mode; and
monitoring the downlink control channel during an on-duration of the DRX mode, wherein the receiving the first DCI message comprises:
receiving, based at least in part on monitoring the downlink control channel during the on-duration, the first DCI message.

11. A user equipment (UE) comprising:
a memory;
a transceiver; and
at least one processor coupled to the memory and the transceiver, wherein the UE is configured to:
receive, from a base station (BS), one or more repetitions of a first downlink control information (DCI) message scheduling an uplink (UL) data transmission, the first DCI message indicating a first value for an UL schedule timing indicator;
activate a timer based at least in part on the first value of the UL schedule timing indicator and a determination that a last repetition of the one or more repetitions of the first DCI message is received;
monitor a downlink control channel based at least in part on the timer; and
receive, from the BS, a second DCI message indicating UL schedule timing for the UL data transmission based at least in part on the monitoring.

12. The UE of claim 11, wherein the timer is associated with a hybrid automatic repeat request (HARQ) identifier (ID) corresponding to the UL data transmission.

13. The UE of claim 12, wherein the UE configured to activate the timer is further configured to:
   activate a retransmission timer associated with the HARQ ID.

14. The UE of claim 13, wherein:
   the UE configured to activate the timer is further configured to:
      activate the retransmission timer in a first symbol after receiving the first DCI message; and
   the UE configured to monitor the downlink control channel is further configured to:
      monitor the downlink control channel while the retransmission timer is active.

15. The UE of claim 13, wherein the UE is further configured to:
   deactivate the retransmission timer based on receiving the second DCI message.

16. The UE of claim 13, wherein:
   the UE configured to activate the timer is further configured to:
      activate a round-trip time timer associated with the HARQ ID; and
      activate the retransmission timer further based on an expiration of the round-trip time timer; and
   the UE configured to monitor the downlink control channel is further configured to:
      monitor the downlink control channel while the retransmission timer is active.

17. The UE of claim 16, wherein the UE configured to activate the timer is further configured to:
   activate the round-trip time timer in a first symbol after receiving the first DCI message.

18. The UE of claim 11, wherein:
   the second DCI message indicates a second value for the UL schedule timing; and
   the UE is further configured to:
      transmit, to the BS, the UL data transmission based at least in part on the second value or a combination of the first value for the UL schedule timing indicator and the second value.

19. The UE of claim 11, wherein:
   the UE is further configured to:
      operate based on a discontinuous reception (DRX) mode;
      monitor the downlink control channel during an on-duration of the DRX mode; and
      deactivate the timer based on receiving the second DCI message, and the UE configured to receive the first DCI message is further configured to:
         receive, based at least in part on monitoring the downlink control channel during the on-duration, the first DCI message.

20. A non-transitory computer-readable medium having program code recorded thereon for wireless communication by a user equipment (UE), the program code comprising:
   code for causing the UE to receive, from a base station (BS), one or more repetitions of a first downlink control information (DCI) message scheduling an uplink (UL) data transmission, the first DCI message indicating a first value for an UL schedule timing indicator;
   code for causing the UE to activate a timer based at least in part on the first value of the UL schedule timing indicator and a determination that a last repetition of the one or more repetitions of the first DCI message is received;
   code for causing the UE to monitor a downlink control channel based at least in part on the timer; and
   code for causing the UE to receive, from the BS, a second DCI message indicating UL schedule timing for the UL data transmission based at least in part on the monitoring.

21. The non-transitory computer-readable medium of claim 20, wherein the timer is associated with a hybrid automatic repeat request (HARQ) identifier (ID) corresponding to the UL data transmission.

22. The non-transitory computer-readable medium of claim 21, wherein:
   the code for causing the UE to activate the timer is further configured to:
      activate a retransmission timer associated with the HARQ ID; and
   the non-transitory computer-readable medium further comprises:
      code for causing the UE to deactivate the retransmission timer based on receiving the second DCI message.

23. The non-transitory computer-readable medium of claim 22, wherein:
   the code for causing the UE to activate the timer is further configured to:
      activate the retransmission timer in a first symbol after receiving the first DCI message; and
   the code for causing the UE to monitor the downlink control channel is further configured to:
      monitor the downlink control channel while the retransmission timer is active.

24. The non-transitory computer-readable medium of claim 22, wherein:
   the code for causing the UE to activate the timer is further configured to:
      activate a round-trip time timer associated with the HARQ ID; and
      activate the retransmission timer based on an expiration of the round-trip time timer; and
   the code for causing the UE to monitor the downlink control channel is further configured to:
      monitor the downlink control channel while the retransmission timer is active.

25. The non-transitory computer-readable medium of claim 24, wherein the code for causing the UE to activate the timer is further configured to:
   activate the round-trip time timer in a first symbol after receiving the first DCI message.

26. The non-transitory computer-readable medium of claim 20, wherein:
   the second DCI message indicates a second value for the UL schedule timing; and
   the program code further comprises:
      code for causing the UE to transmit, to the BS, the UL data transmission based at least in part on the second value or a combination of the first value for the UL schedule timing indicator and the second value.

27. The non-transitory computer-readable medium of claim 20, further comprising:
   code for causing the UE to operate based on a discontinuous reception (DRX) mode; and
   code for causing the UE to monitor the downlink control channel during an on-duration of the DRX mode, wherein the code for causing the UE to receive the first DCI message is further configured to:

receive, based at least in part on monitoring the downlink control channel during the on-duration, the first DCI message.

* * * * *